(12) United States Patent
Ghahramanian

(10) Patent No.: US 12,594,494 B2
(45) Date of Patent: Apr. 7, 2026

(54) SUPPORT FRAME ASSEMBLY AND METHODS OF USE THEREOF

(71) Applicant: Next Level Racing Simulations Pty Ltd, Southport (AU)

(72) Inventor: Hessam Ghahramanian, Southport (AU)

(73) Assignee: Next Level Racing Simulations Pty Ltd, Southport (AU)

( * ) Notice: Subject to any disclaimer, the term of this patent is extended or adjusted under 35 U.S.C. 154(b) by 250 days.

(21) Appl. No.: 18/549,502

(22) PCT Filed: Mar. 8, 2022

(86) PCT No.: PCT/AU2022/050191
§ 371 (c)(1),
(2) Date: Sep. 7, 2023

(87) PCT Pub. No.: WO2022/187895
PCT Pub. Date: Sep. 15, 2022

(65) Prior Publication Data
US 2024/0149150 A1 May 9, 2024

(30) Foreign Application Priority Data

Mar. 9, 2021 (AU) ................................ 2021900665
Nov. 29, 2021 (AU) ................................ 2021903851

(51) Int. Cl.
*A63F 13/245* (2014.01)
*A63F 13/803* (2014.01)
*G09B 9/04* (2006.01)

(52) U.S. Cl.
CPC .......... *A63F 13/245* (2014.09); *A63F 13/803* (2014.09); *G09B 9/04* (2013.01)

(58) Field of Classification Search
CPC .................. A63F 13/245; A63F 13/803; A63F 2300/1062; A63F 2300/8017; G09B 9/04
See application file for complete search history.

(56) References Cited

U.S. PATENT DOCUMENTS

| | | | | |
|---|---|---|---|---|
| 6,083,106 A * | 7/2000 | McDowell | ............ | A63F 13/803 463/6 |
| 7,662,042 B2 * | 2/2010 | Oswald | ................. | A63F 13/803 463/31 |

(Continued)

FOREIGN PATENT DOCUMENTS

| | | | | |
|---|---|---|---|---|
| CN | 101214143 A | * | 7/2008 | |
| CN | 201921471 U | * | 8/2011 | |

(Continued)

OTHER PUBLICATIONS

"ART Racing Cockpit for Sim Racing," published Jun. 17, 2019. Source: https://gtomega.com/products/art-racing-cockpit (Year: 2019).*

(Continued)

*Primary Examiner* — Steven J Hylinski
(74) *Attorney, Agent, or Firm* — Fox Rothschild LLP

(57) ABSTRACT

A support frame assembly and parts and methods of use thereof for a racing simulator cockpit are provided. In one form, the support frame assembly includes: a base frame; a pair of opposed seat brackets extending from opposed sides of the base frame for adjustably mounting a seat in at least two configurations corresponding to a formula one racing configuration and a grand touring racing configuration; at least one pedal set support bracket extending upwards from one opposed side of the base frame at or near a forward end for supporting a pedal set adapted to be pivotable relative to the base frame between the at least two configurations; and a steering wheel assembly support frame extending upwardly from the base frame at a location between the seat (Continued)

brackets and the at least one pedal set support bracket for supporting at least a steering wheel assembly.

20 Claims, 14 Drawing Sheets

(56)                    References Cited

U.S. PATENT DOCUMENTS

| | | | | |
|---|---|---|---|---|
| 7,798,814 | B2 * | 9/2010 | Makuta | G09B 9/058 |
| | | | | 434/61 |
| D856,020 | S * | 8/2019 | Ghahramanian | D6/367 |
| 10,413,815 | B2 * | 9/2019 | Ergen | A63F 13/98 |
| 10,953,321 | B2 * | 3/2021 | Van Beek | A63F 13/213 |
| D988,407 | S * | 6/2023 | Smit | D21/326 |
| 2019/0358536 | A1 | 11/2019 | Van Beek | |
| 2022/0176257 | A1 * | 6/2022 | Smit | A63F 13/90 |

FOREIGN PATENT DOCUMENTS

| | | | | | |
|---|---|---|---|---|---|
| CN | 202223886 U | * | 5/2012 | | A63F 13/245 |
| CN | 105894889 A | * | 8/2016 | | G09B 9/04 |
| EP | 1923107 A1 | * | 5/2008 | | A63F 13/803 |
| EP | 2820976 A2 | * | 1/2015 | | G09B 9/28 |
| KR | 20070030787 A | * | 3/2007 | | A63F 13/803 |

OTHER PUBLICATIONS

"VRH-TX Tubular Racing Simulator Cockpit," published Sep. 1, 2020. Source: https://www.virtualracinghub.com/products/vrh-tx-tubular-racing-simulator-cockpit (Year: 2020).*

"V-Rig Racing Simulators," published May 20, 2019. Source: https://vrig.com (Year: 2019).*

"Accessories Treq Sim Racing Equipment," published Jul. 30, 2020. Source: https://www.treq-sim.com/shop/category/accessories-5 (Year: 2020).*

Next Level Racing F-GT Elite Formula & GT Aluminium Profile Simulator Cockpit [retrieved from the internet Nov. 18, 2021]<URL:https://pagnianimports.com.au/collections/racingcockpits/products/next-level-racing-f-gt-elite-formula-gt-aluminiumprofile-simulator-cockpit-wheel-plate-edition> Published 2021.

Next Level Racing F-GT Formula & GT Simulator Cockpit [retrieved from the internet Nov. 18, 2021]<URL:https://pagnianimports.com.au/collections/racingcockpits/products/next-level-racing-f-gt-formula-gt-simulator-cockpitmatte-black> Published on Nov. 11, 2020 as per Wayback Machine.

* cited by examiner

1100

1100

SUPPORT FRAME ASSEMBLY AND METHODS OF USE THEREOF

CROSS-REFERENCE TO RELATED APPLICATIONS

This application is the U.S. national stage application filed under 37 U.S.C. 371 based on International Patent Application No. PCT/AU2022/050191, filed on Mar. 8, 2022 which claims priority to Australian Patent Application No. 2021900665 filed on Mar. 9, 2021 and Australian Patent Application No. 2021903851 filed on Nov. 29, 2021, the disclosures of which are incorporated herein by reference in their entirety.

TECHNICAL FIELD

The present invention relates to a support frame assembly and parts and methods of use thereof for a racing simulator cockpit.

BACKGROUND

Racing simulator cockpits utilizing motion platforms are becoming increasingly popular not only as a recreational activity but also as a training facility for professional racing drivers.

Typically, such cockpits are provided in a kit or assembly form that can be readily shipped. Such kits or assemblies include, amongst other items, a base frame, a seat, a pedal set, a steering assembly, and optionally a motion simulator.

A problem in general with such kits or assemblies is that they are commonly a mixture of individually sourced components that are crudely combined to form the simulator cockpit. Apart from lacking the authenticity of a driver's race car environment, such kits or assemblies are often made of cheap components that scuff or damage readily and are difficult to assemble, disassemble or adjust. For example, it is common for such kits or assemblies to include corner brackets for connections, which are difficult and time consuming to assemble.

A further specific problem with such kits or assemblies relates to the use of seat sliders to adjustably couple a seat to a base frame. While the use of such seat sliders is considered necessary to enable a simulator cockpit to be adjustable, the present inventor has found that the seat sliders provide too much flex and movement in an associated seat and consequently detract from the authenticity of the race car environment. Indeed, in some instances, seat sliders can create a disconnect between the driver and the experience since the sliders dampen tactile feedback from the motion simulator.

Yet a further specific problem with such kits or assemblies is that when assembled the cockpit typically only provides a single racing configuration, such as, e.g., grand touring ("GT") or formula one. Although some kits or assemblies provide crude work arounds to interchange the cockpit between formula one and GT racing configurations, such work arounds often involve simply pivoting the base frame of the cockpit at one end and do not provide a truly interchangeable cockpit. Rather, such cockpits lack the required rigidity and instead conjure an environment of driving a race car on a rickety picnic, camping or beach chair or recliner.

The above specific problem is particularly pronounced when replicate race car pedal sets are used, such as, e.g., Heusinkveld™ Sim Pedals Ultimate+, in a formula one racing configuration. Such pedal sets are generally capable of handling up to 140 kg of actual force and include hydraulic damping when actuating the respective pedals. As a result, it is common for a pedal set support frame supporting such a pedal set to flex and move when the individual pedals are being actuated thereby distracting the driver and detracting from the driver's performance and the overall simulated racing experience.

Indeed, when such pedal sets are used, it is not uncommon for a pedal set in a formula one racing configuration to move or shift mid-race thereby ruining the racing experience.

It will be clearly understood that, if a prior art publication is referred to herein, this reference does not constitute an admission that the publication forms part of the common general knowledge in the art in Australia or in any other country.

SUMMARY OF INVENTION

Embodiments of the present invention provide a support frame assembly and parts thereof for a racing simulator cockpit and a method of use thereof, which may at least partially address one or more of the problems or deficiencies mentioned above or which may provide the public with a useful or commercial choice.

According to a first aspect of the present invention, there is provided a support frame assembly for a racing simulator cockpit, said assembly including:

a base frame defining a forward end and an opposed rear end;

a pair of opposed seat brackets extending from opposed sides of the base frame at or near the rear end for adjustably mounting a seat, said seat brackets adapted to interchangeably mount the seat in the formula one racing configuration and the grand touring racing configuration;

a steering wheel assembly support frame extending upwardly from the base frame at a location between the seat brackets and the forward end of the base frame;

a pedal support frame for having a pedal set mounted thereon, said pedal support frame pivotally coupled at a first end to the steering wheel assembly support frame and having an opposed second end pivotable between the formula one racing configuration and the grand touring racing configuration; and at least one pedal set support bracket extending upwards from one of the opposed sides of the base frame at or near the forward end for supporting the pedal support frame, said pedal set support bracket adapted to be pivotable relative to the base frame for selectively securing the pedal support frame between the formula one racing configuration and the grand touring racing configuration.

According to a second aspect of the present invention, there is provided a base frame member for forming a base frame for a support frame assembly, said base frame connectable with at least one other like base frame member to form the base frame, said base frame member including:

a pair of opposed ends; and at least four sidewalls extending longitudinally between the opposed ends, said sidewalls including an upper sidewall, an opposed lower sidewall, an inner frame sidewall and an opposed outer frame sidewall having:

at least one fastener channel extending at least partially along a length of the outer frame sidewall between the opposed ends for receiving one or more fasteners for fastening assembly components to the base frame; and a receiving opening defined by an angled wall portion extending inwards from an edge adjacent the lower sidewall and the outer frame sidewall to define a groove for receiving lighting therein.

According to a third aspect of the present invention, there is provided a seat bracket for use with the assembly of the first aspect, said seat bracket configured to be mounted to a side of the base frame for adjustably mounting a seat relative to the base frame, said seat bracket defining a plurality of mount points for adjustably mounting the seat in at least two configurations corresponding to a formula one racing configuration and a grand touring racing configuration.

According to a fourth aspect of the present invention, there is provided a pedal set support bracket for use with the assembly of the first aspect, said support bracket configured to extend upwards from the base frame at or near a forward end of the assembly and support a pedal set relative to the base frame, said pedal set support bracket configured to be pivotable relative to the base frame between at least two configurations corresponding to a formula one racing configuration and the grand touring racing configuration.

According to a fifth aspect of the present invention, there is provided a seat slide assembly for use with a support frame assembly of a racing simulator cockpit, said seat slide assembly including:

at least a pair of slide brackets each configured to slidably mount a seat to a base frame of the support frame, said base frame including at least two base frame members connectable together, each base frame member defining at least a side of the base frame and having at least one fastener channel extending at least partially along a length of the side; and at least a pair of slide fasteners each operatively associated with the at least one fastener channel of each base frame member for releasably securing each slide bracket relative to the side of the base frame.

According to a sixth aspect of the present invention, there is provided a mounting assembly for a pedal set support frame of a racing simulator cockpit, said assembly including:

at least one mounting bracket for interfacing a connection between a base frame and a steering wheel assembly support frame of the cockpit and for pivotally mounting the pedal set support frame at or near a first end, said mounting bracket having a pair of opposed planar surfaces interconnected by opposing edges and having a plurality of apertures defined thereon for receiving fasteners therethrough for at least interconnecting the base frame and the steering assembly support frame via the mounting bracket; and at least one stabilising mount for stabilising the pedal set support frame relative to the base frame, said mount including a base frame mounting portion for engaging with the base frame and a pedal set support frame mounting portion extending upwardly therefrom and including a plurality of apertures defined thereon in a stacked arrangement and extending at least partially along a height of the pedal set support frame mounting portion, each aperture defining a discrete mounting point configured to selective receive a fastener therethrough for mounting the pedal set support frame at a selected position between the raised and lowered positions.

According to a seventh aspect of the present invention, there is provided a pedal set support frame assembly for a racing simulator cockpit, said assembly including:

at least one mounting bracket for interfacing a connection between a base frame and a steering wheel assembly support frame of the cockpit, said mounting bracket having a pair of opposed planar surfaces interconnected by opposing edges and having a plurality of apertures defined thereon for receiving fasteners therethrough for at least interconnecting the base frame and the steering wheel assembly support frame via the mounting bracket;

a pedal set support frame for mounting a pedal set thereon, said frame having a first end pivotally mountable to at least one mounting bracket and an opposed second end pivotable between raised and lowered positions relative to the base frame; and at least one stabilising mount for stabilising the pedal set support frame relative to the base frame, said mount including a base frame mounting portion for engaging with the base frame and a pedal set support frame mounting portion extending upwardly therefrom and including a plurality of apertures defined thereon in a stacked arrangement and extending at least partially along a height of the pedal set support frame mounting portion, each aperture defining a discrete mounting point configured to selectively receive a fastener therethrough for mounting the pedal set support frame at a selected position between the raised and lowered position relative to the base frame.

According to an eight aspect of the present invention, there is provided a mounting bracket for use or when used with the assembly of the sixth or seventh aspects for interfacing a connection between a base frame and a steering wheel assembly support frame of a racing simulator cockpit and for pivotally mounting the pedal set support frame relative thereto, said mounting bracket having a pair of opposed planar surfaces interconnected by opposing edges and having a plurality of apertures defined thereon for receiving fasteners therethrough for at least interconnecting the base frame and the steering wheel assembly support frame about the mounting bracket.

According to a ninth aspect of the present invention, there is provided a stabilising mount for use or when used with the assembly of the sixth or seventh aspects for stabilising a pedal set support frame relative to a base frame of a racing simulator cockpit, said mount including a base frame mounting portion for engaging with the base frame and a pedal set support frame mounting portion extending upwardly therefrom and including a plurality of apertures defined thereon in a stacked arrangement and extending at least partially along a height of pedal set support frame mounting portion, each aperture defining a discrete mounting point configured to selectively receive a fastener therethrough for mounting the pedal set support frame between raised and lowered positions relative to the base frame.

According to a tenth aspect of the present invention, there is provided an end cap for an end of a frame member having at least one fastener channel extending at least partially along a length of a side of the frame member, said end cap configured to be operatively associated with the end of the frame member and having at least one opening defined in an edge of the end cap configured to be in fluid communication with the at least one fastener channel so that a slide fastener can be inserted into, or removed from, the at least one fastener channel without the end cap being removed.

According to an eleventh aspect of the present invention, there is provided a tool holder for use with the support frame assembly of the first aspect, said holder having a body configured to be releasably secured to a frame member of the support frame assembly, said body defining at least one opening for at least partially receiving and holding a tool.

According to a twelfth aspect of the present invention, there is provided a cable clip for use with the support frame assembly of the first aspect, said clip having a body configured to be releasably secured to a frame member of the support frame assembly, said body defining a pair of opposed clamping members configured to releasably clamp at least one cable therebetween.

Advantageously, the present invention provides a support frame assembly that can be readily assembled, disassembled and/or modified and yet has the required rigidity to provide a truly authentic driver's race car environment.

Further, the assembly components can be readily adjusted relative to one another to adapt the assembly to various racing configurations while still maintaining that required rigidity.

Moreover, the seat slide assembly of the present invention obviates any disconnect between the driver and the experience allowing the driver to receive realistic tactile feedback from a motion simulator while still allowing the seat position to be readily adjusted.

Lastly, the mounting assembly of the present invention enables a pedal set support frame to be stably mounted relative to the base frame of a racing simulator cockpit, while still enabling the pedal set support frame and thus the pedal set to be pivotable between raised and lowered positions, including between a formula one racing configuration and a grand touring ("GT") racing configuration as well as other racing configurations. Accordingly, the assembly obviates any disconnect between the driver and the experience allowing the drive to receive realistic tactile feedback from a pedal set without risk of the pedal set support frame moving or shifting mid-race.

As indicated, the support frame assembly and parts thereof for a racing simulator cockpit are interchangeable between at least two configurations, including a formula one racing configuration and a grand touring ("GT") racing configuration, and that provides a more authentic racing experience.

As used herein, the term "formula one racing configuration" refers to a cockpit configuration in which the seat is angled backwards at angle of about 120° or greater relative to a horizontal plane and a pedal set is arranged relative to cockpit configuration at an angle of about 45° or greater relative to a horizontal plane. Generally, in a formula one racing configuration, the pedal support bracket extends substantially vertically upwards from the base frame such that a pedal set mounted thereon is mounted at an angle of about 45° or greater relative to the horizontal plane.

As used herein, the term "grand touring racing configuration" or "GT racing configuration" refers to a racing configuration in which the seat is more upright compared to the formula one racing configuration, typically having an angle of less than 120° relative to a horizontal plane, and a pedal set extends in a substantially horizontal orientation. Generally, in a GT racing configuration, the pedal support bracket extends substantially forward from the base frame such that a pedal set mounted thereon is mounted in a substantially horizontal orientation.

In some embodiments, the support frame assembly may provide more than two racing configurations. For example, the assembly may further include a hybrid racing configuration in which the seat is mounted at the same or a similar orientation and/or position as the GT racing configuration and the pedal set is mounted in the same or a similar orientation and/or position as the formula one racing configuration.

As indicated, the support assembly includes a base frame defining a forward end and an opposed rear end of the support assembly, and preferably opposed sides extending therebetween.

The base frame may be of any suitable size, shape and construction for supporting the support assembly relative to a support surface and may be formed from any suitable material or materials. For example, the base frame may be formed from metal and/or plastic material or materials, preferably the latter, more preferably aluminium, steel, titanium or a composite thereof.

The frame may be rectangular, circular, triangular, pentagonal, hexagonal, heptagonal, octagonal or any variation or combination thereof, preferably rectangular.

Typically, the frame may be formed from two or more frame members joined together, preferably four frame members.

The frame members may be of tubular or solid construction, preferably the former. Each frame member may have a substantially circular, oval or rectangular-shaped cross section, preferably rectangular.

Each frame member may include a pair of opposed ends and an elongate body having at least one sidewall extending therebetween, preferably in a linear direction. The elongate body may preferably be defined by four sidewalls, including an upper sidewall, an opposed lower sidewall, an inner frame sidewall and an opposed outer frame sidewall. Each end and/or end portion may be adapted to be connectable either directly or indirectly with other frame members to assemble the frame.

The frame members may be constructed in any suitable way. For example, the frame members may be machine folded from sheet metal or may be extrusions, typically the latter.

Suitably, the frame members may be of any suitable length to form the frame of a desired shape, preferably rectangular.

Likewise, the frame members may have any suitable width and height. For example, the frame members may have a width and/or height ranging from about 20 mm to about 200 mm, preferably from about 40 mm to about 160 mm, more preferably from about 40 mm to about 100 mm.

As indicated, the frame members may be joined or connected together end to end or end portion to end portion either directly or indirectly in any suitable way to form the base frame. Usually, the frame members may be connected at right angles/90° relative to one another to form a rectangular base frame. Typically, each join may include at least two frame members.

Any type of join may be used between adjacent frame members.

For example, if the frame members are directly joined or connected together, the join may be a butt joint, a mitre joint, a lap joint or a daddo joint, typically a butt joint.

In some embodiments, each frame member may include mateable ends that mate or couple with respective ends of other frame members, such as, e.g., a threaded connection, an interference (snap-fit) connection, a bayonet-type connection or a friction fit connection.

In some such embodiments, a first end of a frame member may include a male formation configured to be inserted into, or coupled with, a female formation of a second end of another frame member.

In other embodiments, the frame members may be joined together via a joining component adapted to be operatively associated with the ends of the frame members to be joined. Each join may include one or more joining components.

The joining component may be operatively associated with the respective ends or end portions of the frame members in any suitable way. For example, the joining component may be fastened to each or one of the frame members by one or more fasteners or adhesives.

In some embodiments, the joining component may include a bracket, such as, e.g., a corner bracket.

In other embodiments, the joining component may include a corner connector.

In preferred embodiments, the base frame may be formed by four frame members joined together, including a pair of side frame members extending longitudinally and substantially parallel to one another and joined together by a pair of cross frame members extending laterally relative to the side frame members and substantially parallel to one another.

The pair of cross frame members may extend between the respective end portions of the side frame members and define the forward end and the rear end of the base frame.

Each cross frame member and side frame member may be joined together at a butt joint, preferably with one or more mechanical fasteners. The end portion of each side frame member may include one or more openings extending through the inner and outer frame sidewalls at or near each end and the end of each cross frame member may include one or more corresponding openings configured to align with the openings in the side frame member and receive a mechanical fastener therethrough for joining the side frame member and cross frame member together.

As indicated, each frame member may include at least one fastener channel extending at least partially along a length of the outer frame wall between the opposed ends, preferably the entire length.

The channel may be of any suitable size and shape and may have any suitable profile shape for having one or more fasteners releasably secured thereon, preferably slidably mounted.

In preferred embodiments, the channel may be sized and shaped to enable a fastener to be slid along the channel but prevent lateral movement or separation of the fastener away from the channel.

In some such embodiments, the channel may have a C-shaped cross-section.

In other such embodiments, the channel may have T-shaped or trapezoidal cross-section.

Any suitably type of fastener may be releasably secured to the channel, preferably slidably mounted.

Generally, the fastener may be a slide fastener configured to be slidably mounted to the channel for releasably securing components thereon.

Typically, the fastener may include an enlarged head, a threaded shank extending away from the head.

Suitably, the enlarged head may be configured to be slidably mounted to the channel via an end and be slid into position. The head may be sized and shaped to be slidable along a length of the channel but incapable of lateral separation away or disengagement from the channel.

The shank may include a threaded shank portion.

In some embodiments, the fastener may further include a nut configured to be threadingly fastened relative to the shank. The nut may be a wing nut. Alternatively, the nut may include one or more handles extending away from the nut to facilitate tightening and loosening of the nut relative to the shank.

In other embodiments, various components for securing to the channel may include a threaded opening configured to be threadingly fastened relative to the shank.

In some embodiments, each frame member may include more than one fastener channel extending at least partially along its length.

For example, each frame may include one or more fastening channels extending along at least two sidewalls, preferably all sidewalls. Likewise, each frame member may include more than one fastening channel extending along a same sidewall, preferably in a parallel arrangement.

In some embodiments, each sidewall of a frame member may include a single fastener channel extending at least partially along a length of the frame member, preferably entirely.

In other embodiments, each of the upper sidewall and the lower sidewall of a frame member may include a single fastener channel extending at least partially along a length of the frame member, and the inner frame sidewall and opposed outer frame sidewall may each have a pair of fastener channels extending substantially parallel to one another at least partially along the length of the frame member.

As indicated, in some embodiments, at least some frame member may further include a receiving opening defined by an angled wall portion extending inwards from an edge adjacent the lower sidewall and the outer frame sidewall to define a groove, preferably frame members forming the base frame. The receiving opening and groove may preferably extend an entire length of the frame member.

The angled wall portion may extend inwards from the edge at any suitable angle relative to the lower sidewall. For example, the angled wall portion may extend inwards, relative to the lower sidewall, at an angle ranging from about 20° to about 85°, typically from about 50° to about 75°, preferably about 70°.

As indicated, the resulting groove may be of any suitable size and shape for receiving lighting therein, preferably strip lighting, such as, e.g., an LED strip. Advantageously, the strip lighting may enhance the aesthetic appeal of the racing simulator cockpit and the racing/gaming experience. Preferably, the resulting groove may be sized and shaped to at least partially receive the lighting therein such that it is at least partially concealed.

In some embodiments, an outer surface of the angled portion may also be used for signage. Advantageously, by being angled, any signage applied thereon may be readily viewable, particularly when illuminated by lighting located immediately above.

The pair of opposed seat brackets may be of any suitable size, shape and construction for adjustably mounting a seat relative to the base frame at or near the rear end of the base frame.

In some embodiments, each bracket may have a substantially L-shaped cross section having a base frame engaging portion that may be fastened either directly or indirectly atop the base frame, and a seat engaging portion adapted to be fastened to a seat. The seat engaging portion may be orthogonally angled relative to the base frame engaging portion, preferably from a common or shared edge.

Each portion may include one or more apertures sized and shaped to receive mechanical fasteners or the like therethrough for fastening the portions to the base frame and the seat, respectively.

In some such embodiments, each portion may include a plurality of apertures thereby providing a plurality of mount points for adjustably mounting the seat relative to the base frame.

Each bracket may preferably extend longitudinally between a rear-facing edge and an opposed forward-facing edge.

In preferred embodiment, the seat engaging portion of each bracket may preferably include a plurality of elongate apertures defined at or near the rear-facing edge and extending in a stacked arranged along a height of the portion and a plurality of substantially circular apertures defined at or near the forward-facing edge and extending in a stacked arrangement along a height of the portion. In use, the elongate apertures together with the substantially circular apertures may enable the seat to be precisely mounted at a desired angle relative to the base frame corresponding to at least one of the at least two configurations.

As indicated, in some embodiments, the seat may be indirectly mounted to the base frame via the slide brackets of the seat slide assembly.

In some such embodiments, each seat bracket may be slidable relative to the base frame via at least one slide bracket associated with the seat bracket and slidably mounted to the at least one fastener channel extending at least partially along a length of a side of the base frame, preferably the outer frame sidewall of a side frame member. The at least one slide bracket may be slidably mounted to the at least one fastener channel with a slide fastener as previously described.

In other such embodiments, the seat slide assembly may include at least a pair of slide brackets each configured to be slidably mounted to a respective side of the base frame and interconnected by a frame member extending therebetween.

Each slide bracket may be fastened to an end of the frame member, preferably via a mechanical fastener received through an aperture defined in the slide bracket and in the end of the frame member.

Like with the earlier embodiments, each slide bracket may be slidably mounted to the at least one fastener channel extending at least partially along a length of an adjacent side of the base frame, preferably the outer frame sidewall of a side frame member. Again, each slide bracket may be slidably mounted to the at least one fastener channel with a slide fastener as previously described.

Further, in such embodiments, the base frame engaging portion of each seat bracket may be fastened to the frame member of the seat slide assembly, preferably by one or more slide fasteners fastened to at least one fastener channel extending at least partially along an upper sidewall of the frame member. The shanks of the one or more fasteners may extend upwardly from the channel and through the apertures defined in the base frame engaging portion, and each seat bracket may be fastened in place by one or more nuts threadingly fastened relative to the shanks.

As indicated, the support frame assembly includes at least one pedal set support bracket extending upwards from one of the opposed sides of the base frame at or near the forward end for supporting a pedal set, preferably a pair of pedal set support brackets extending upwards from opposed sides of the base frame.

The bracket may be of any suitable size, shape and construction to support the pedal set relative to the base frame and be pivotable relative to the base frame between the at least two configurations, preferably height adjustable.

Each bracket may directly or indirectly support the pedal set. If indirectly, the bracket may support a pedal support frame on which the pedal set is mounted.

Generally, the bracket may have an elongate planar shape. The bracket may include a pair of opposed surfaces, including an inner surface and an opposed outer surface. The opposed surfaces may extend substantially parallel to one another and be interconnected by opposing edges.

The bracket may include opposed ends, including a base frame mounting end and an opposed pedal set engaging end. The bracket may extend longitudinally between the opposed ends, preferably in an arc curving backwards towards the rear end of the base frame.

The base frame mounting end may include one or more apertures defined thereon for receiving one or more mechanical fasteners therethrough for fastening the bracket to the base frame, preferably one or more slide fasteners for fastening the end to the at least one fastening channel. The one or more apertures may be substantially circular, elongate and/or arcuate in shape. The latter may advantageously facilitate pivoting of the bracket between the at least two configurations or adjusting a position of the pedal set.

If directly mounting the pedal set, the pedal set engaging end may include one or more apertures defined thereon for receiving one or more mechanical fasteners therethrough for fastening the pedal set to the end in a desired orientation.

If indirectly mounting the pedal set, the pedal set engaging end may include a shaped aperture defining two or more mounting or locking positions for mounting or locking the pedal support frame at a desired orientation relative to the base frame.

The shaped aperture may include an elongate aperture portion extending partially towards the base frame mounting end and including two or more mounting or locking aperture portions branching off the elongate aperture portion at an angle and in a spaced arrangement relative to one another for slidably receiving one or more fasteners protruding outwardly from the pedal support frame and mounting or locking the pedal support frame at a desired orientation relative to the at least one bracket.

The pedal support frame may be of any suitable size, shape and construction to have a pedal set mounted thereon and be slidably mounted to the pedal set support bracket.

Typically, the pedal support frame may include a pair of opposed side frame members pivotally coupled at one end to the steering wheel assembly support frame and joined together at or near an opposite end by at least one cross frame member. Together with the at least one bracket, the pedal support frame may be pivotable between the at least two configurations corresponding to the formula one and GT racing configurations.

Suitably, at least one of the pair of opposed side frame members may be slidably mounted to the pedal set support bracket, preferably both are slidably mounted to respective said pedal set support brackets.

In some embodiments, at least one side frame member of the pedal support frame and the at least one bracket may be slidably mounted together by at least one slide fastener operatively associated with at least one fastener channel extending at least partially along a length of the frame member and releasably fastened to the shaped aperture of the bracket.

In preferred embodiments, the support assembly may include a pair of opposed brackets and each side frame member of the pedal support frame may be slidably mounted to an adjacent said bracket by at least one slide fastener operatively associated with the at least one fastener channel extending along the frame member and releasably fastened to the shaped aperture of the adjacent said bracket.

In use, the pedal support frame and a pedal set mounted thereon may be pivotable relative to the base frame and the steering wheel support frame to two or more pivot positions corresponding to the two or more mounting or locking positions of the shaped aperture of the bracket. Advantageously, the pivoting of the pedal support frame relative to the base frame enables the height of any pedal set mounted thereon to be highly adjustable.

As indicated, the support frame assembly includes a steering wheel assembly support frame extending upwardly from the base frame at location between the seat brackets and the pedal support bracket for supporting at least a steering wheel assembly, preferably also for supporting a gear stick shifter assembly and/or a handbrake support assembly. The steering wheel assembly support frame may preferably be adjustable so that a height, angle and/or distance of the steering wheel assembly may advantageously be customisable relative to a driver's desired position.

The support frame may be of any suitable size, shape and construction to support at least the steering wheel assembly relative to the base frame.

For example, in some embodiments, the support frame may include an L-shaped frame member including a first portion extending upwardly from a side of the base frame to an operable height and a second portion extending orthogonally from the first portion for supporting the steering wheel assembly relative to the base frame.

In other embodiments, the support frame may include a U-shaped frame member including first and third portions extending upwardly from opposed sides of the base frame to an operable height and a second portion extending between the upper ends of the first and third portions for supporting the steering wheel assembly relative to the base frame.

In other embodiments, the frame may include at least one frame member extending upwardly from a side of the base frame to an upper end and at least one support bracket extending horizontally from the upper end of the at least one frame member for supporting the steering wheel assembly relative to the base frame.

In preferred embodiments, the frame may include a pair of opposed frame members extending upwardly from opposed sides of the base frame and at least one support bracket extending between upper ends of the frame members for supporting the steering wheel assembly relative to the base frame. The at least one support frame may be slidably mounted to the opposed frame members to enable a height of a steering wheel assembly mounted thereon to be adjustable.

In such embodiments, the various frame members may be as previously described and may be joined together by any one of the joins or joining components as previously described.

The support bracket may be of any suitable size, shape and construction for having the steering wheel assembly mounted thereon.

Typically, the bracket may have an elongate planar shape. The bracket may include a pair of opposed surfaces, including an upper surface and an opposed lower surface. The opposed surfaces may extend substantially parallel to one another and be interconnected by opposing edges.

The bracket may include opposed ends connectable to the upper ends of the frame members. The bracket may extend longitudinally between the opposed ends.

The opposed surfaces of the bracket may include one or more apertures defined thereon for receiving one or more fasteners therethrough for fastening the steering wheel assembly to the support bracket.

In some embodiments, one or both of the opposed ends may include a folded flange portion for connection to an adjacent frame member, preferably orthogonally folded. Like the opposed surfaces, each folded flange portion may include one or more apertures defined thereon for receiving one or more fasteners therethrough for fastening to the upper end of the adjacent frame member, preferably with a slide fastener and fastener channel arrangement as previously described.

Each frame member may include a pair of opposed ends, including the upper end and an opposed base frame mounting end.

The base frame mounting end may be directly or indirectly mounted to the at least one fastener channel extending at least partially along a length of a side of the base frame, preferably the outer frame sidewall of a side frame member. The base frame mounting end may be slidably mounted to the at least one fastener channel with one or more slide fasteners as previously described.

If indirectly mounted, the base frame mounting end may include a mounting bracket operatively associated with the end and configured to be slidably mounted to the at least one fastener channel with one or more slide fasteners as previously described.

The frame members may extend upwardly from the base frame at any suitable orientation relative to the base frame member, preferably the same orientation.

For example, in some embodiments the frame members may extend upwardly in a substantially vertical orientation.

In other embodiments, the frame members may extend upwardly at an angle relative to the base frame. For example, the frame members may extend upwardly at an acute angle or an obtuse angle relative to the forward end of the base frame, preferably obtuse.

In some embodiments, the frame members may extend upwardly at an angle ranging from about 91° to about 140° relative to the forward end of the base frame, preferably from about 91° to about 120°, more preferably at an angle of about 110°.

As indicated, in some embodiments, the pedal support frame may be pivotally coupled to the steering wheel assembly support frame, preferably to at least one of the frame members extending upwardly from the base frame.

In some such embodiments, the opposed side frame members of the pedal support frame may each be pivotally coupled to the respective frame members of the steering wheel assembly support frame. Typically, the pedal support frame may be pivotally coupled via a coupling bracket slidably fastened to the at least one fastener channel extending at least partially along a forward-facing sidewall of each frame member of the steering wheel assembly support frame, preferably at a location near the base frame mounting end.

In some embodiments, the steering wheel assembly support frame may further include a subframe for supporting a gear stick shifter assembly, and preferably also handbrake support assembly. In some embodiments, the subframe may further support other accessories, including, but not limited to, a keyboard, a mouse holder, a tablet holder and/or a button box holder.

The subframe may be of any suitable size, shape and construction and may be associated with the support frame in any suitable way.

Generally, the subframe may extend from one side of the support frame and may include one or more frame members for supporting the gear stick shifter assembly and/or handbrake support assembly relative to the base frame.

For example, in some embodiments, the subframe may include an L-shaped frame member including a first portion extending outwardly from a frame member of the steering wheel assembly support frame and a second portion extending downward from the first portion for coupling with a side frame member of the base frame. In such embodiments, the first portion may be configured to have the gear stick shifter assembly and/or handbrake support assembly mounted thereon.

In other embodiments, the subframe may include a first frame member extending rearwardly from an outer frame sidewall of a frame member of the steering wheel assembly support frame, and a second frame member extending downwardly from a rearmost end of the first frame member.

Typically, the first and second frame members may be joined together and may be respectively joined to a frame member of the steering wheel assembly support frame and a side frame member of the base frame with the fastener channel and slide fastener arrangement as hereinbefore described.

In some such embodiments, the gear stick shifter assembly and/or handbrake support assembly may be mounted directly atop the first frame member.

The first frame member may be slidably mounted to the steering wheel assembly support frame and the second frame member so as to enable a height of a gear stick shifter assembly and/or handbrake support assembly mounted thereon to be adjustable.

In other such embodiments, the subframe may further include a mounting bracket configured to be fastened atop the first frame member for having the gear stick shifter assembly and/or handbrake support assembly mounted thereon. The bracket may include one or more apertures defined thereon for receiving one or more mechanical fasteners therethrough for fastening the gear stick shifter assembly and/or handbrake support assembly to the bracket.

As indicated in the sixth, seventh, eight and ninth aspects of the invention, in some embodiments at least one mounting bracket is provided for interfacing a connection between a base frame and a steering wheel assembly support frame and for pivotally mounting the pedal set support frame.

The mounting bracket may be of any suitable size, shape and construction and may be formed from any suitable material or materials, typically a rigid material that may stabilise the connection between the base frame and the steering wheel assembly support frame, preferably metal.

Generally, the mounting bracket may have a substantially planar shape. The bracket may have a substantially triangular, rectangular or polygonal shape, preferably substantially rectangular.

The mounting bracket may include a pair of opposed surfaces, including an inner surface configured to engage with the base frame and an opposed outer surface configured to engage with the steering wheel assembly support frame. The opposed surfaces may extend substantially parallel to one another.

In use, the mounting bracket is configured to be mounted between and interconnect an outer surface of a side frame member of the base frame and an inner surface of a side frame member of the steering wheel assembly support frame.

The opposed surfaces may be interconnected by opposing edges. The opposing edges may include a lower edge, an opposed upper edge, a forward edge facing the forward end of the base frame and an opposed rear edge.

The lower and upper edges may extend substantially parallel to one another and be substantially horizontal.

The forward and rear edges may also extend substantially parallel to one another, preferably angled rearwardly so as to match an angle at which the steering wheel assembly support frame angles rearwardly relative to the base frame.

In some embodiments, the rear edge may include a cut-out portion defined at least partially along the rear edge and the upper edge. Advantageously, the cut-out portion may complement the angle at which the steering wheel assembly support frame extends upwards from the base frame to provide a pleasing aesthetic finish.

As indicated, the mounting bracket may include a plurality of apertures defined thereon for receiving fasteners therethrough for at least interconnecting the base frame and the steering wheel assembly support frame.

The apertures may be suitably sized and shaped to receive fasteners therethrough, preferably mechanical fasteners.

Likewise, the apertures may be arranged in any suitable arrangement on the mounting bracket so as to affect a stable interconnection between the base frame and the steering wheel assembly support frame.

Typically, the apertures may be arranged in a spaced arrangement about a periphery of the mounting bracket.

For example, in some embodiments mounting bracket may include at least four apertures spaced along a lower edge of the bracket for interconnecting a lower end of the steering wheel assembly support frame and a side frame member of the base frame and for connecting the bracket to the side frame member.

In preferred such embodiments, the bracket may include at least six apertures spaced along a lower edge and lower portions of the rear and forward edges for interconnecting a lower end of the steering wheel assembly support frame and a side frame member of the base frame and for connecting the bracket to the side frame member.

The apertures may include opposing pairs of apertures and a central pair located therebetween.

Opposing pairs of apertures defined along the rear and forward edges may each be configured to receive fasteners therethrough for fastening the mounting bracket to an outer surface of a side frame member of the base frame.

A central pair of apertures defined along the lower edge may be configured to receive fasteners therethrough for interconnecting the base frame and the steering wheel assembly support frame.

In other embodiments, the mounting bracket may further include a central pair of apertures defined along the upper edge. The central pair of apertures may be configured to receive fasteners therethrough for fastening to the steering wheel assembly support frame, preferably such that a rear side edge of the steering wheel assembly support frame extends flush with the cut out portion defined at least partially along the upper and rear edges of the mounting bracket.

In some embodiments, the apertures may be arranged on the mounting bracket so as to substantially align with the one or more fastener channels defined on at least the side frame members of the base frame and/or the steering wheel assembly support frame. Advantageously, this may greatly facilitate in assembly of the simulator by enabling fasteners to be slidably mounted to the one or more fastener channels of a side frame member of the base frame and have the mounting bracket and the steering wheel assembly support frame mounted thereon, preferably while still enabling the steering wheel assembly support frame to be slidably adjustable along a length of the base frame even after assembly.

In preferred embodiments, the mounting bracket further define a pivot mount portion for pivotally mounting the first end of the pedal set support frame.

The pivot mount portion may be a corner portion defined at a junction between the upper and forward edges.

The pivot mount portion may include at least one aperture defined thereon for pivotally mounting the first end of the pedal set support frame thereto.

Any suitable number of apertures may be defined on the pivot mount portion. For example, the pivot mount portion may include at least two apertures, at least three apertures, at least four apertures, at least five apertures or even at least six apertures.

In some embodiments, the pivot mount portion may include a pair of apertures defined thereon, preferably in a vertically stacked arrangement, so as to accommodate pedal set support frames formed from frame members of differing thicknesses and not impede pivoting of the pedal set support frame about the first end relative to mounting bracket.

In preferred embodiments, the mounting assembly may include a pair of mounting brackets for interfacing a connection between the base frame and the steering wheel assembly support frame and for pivotally mounting the pedal set support frame on each side of the simulator cockpit.

As indicated, the mounting assembly further includes at least one stabilising mount for stabilising the pedal set support frame relative to the base frame, typically at or near the opposed second end.

The stabilising mount may be of any suitable size, shape and construction and may be formed from any suitable material or materials, typically a rigid material that may stabilise the pedal set support frame relative to the base frame, preferably metal.

Generally, the stabilising may have an elongate substantially planar shape. The mount may have a substantially triangular, rectangular or polygonal shape. Typically, the mount may have a back-to-front letter "L" shape.

The mount may include a pair of opposed surfaces, including an inner surface configured to engage with both the base frame and the pedal set support frame and an opposed outer surface. The opposed surfaces may extend substantially parallel to one another.

The opposed surfaces may be interconnected by opposing edges. The opposing edges may include a lower edge, an opposed upper edge and one or more forward and opposed rear edge portions extending therebetween.

The one or more forward edge portions may include a lower forward edge portion and an upper forward edge portion. The lower and upper forward edge portions may each flare outwards at a junction about partway between the upper and lower edges. The one or more forward edge portion may define a substantially convex forward edge.

The one or more rear edge portions may include three or four rear edge portions that taper inwardly about partway between the upper end lower edges. The one or more rear edges portions may define a substantially concave rear edge.

As indicated, the mount may include a base frame mounting portion for engaging with and mounting to the base frame, preferably an outer sidewall of a side frame member of the base frame. The base frame mounting portion may preferably be located along the lower edge.

The base frame mounting portion may include a plurality of apertures defined thereon for receiving fasteners therethrough for mounting the stabiliser mount to the base frame. The apertures may be suitably sized and shaped to receive fasteners therethrough, preferably mechanical fasteners.

The apertures may be arranged in a spaced arrangement along the lower edge, preferably such that they substantially align with the one or more fastener channels defined on at least the outer sidewall of the side frame member of the base frame. Again, this may advantageously facilitate in assembly of the simulator by enabling fasteners to be slidably mounted to the one or more fastener channels of the base frame and have the stabilising mount mounted thereon. Further, the stabilising mount may be slidably adjustable along a length of the base frame.

Typically, the plurality of apertures may include at least two apertures, preferably three apertures.

As indicated, the stabilising mount further includes a pedal set support frame mounting portion extending upwardly from the base frame mounting portion, typically upwardly from a forward edge portion of the base frame mounting portion.

The pedal set support frame mounting portion may include a plurality of apertures defined thereon in a stacked arrangement and extending at least partially along a height of the portion for providing discrete mounting points for mounting the pedal set support frame at a selected position between the raised and lowered positions.

The selected position may include a GT racing configuration, a formula one racing configuration and one or more positions therebetween. For example, the selected position may further include a hybrid, cup, tank or truck configuration.

Accordingly, the plurality of apertures may include at least three apertures, at least four apertures, at least five apertures, at least six apertures, at least seven apertures, at least eight apertures, at least nine apertures or even at least 10 apertures.

As previously described, the apertures may be suitably sized and shaped to receive fasteners therethrough, preferably mechanical fasteners.

The apertures may be arranged in a spaced arrangement at least partially along a height of the pedal set support frame mounting portion, preferably in a linear stacked arrangement.

In some embodiments, the pedal set support frame mounting portion may be mounted to the pedal set support frame by a fastener mounted to, and extending outwardly from, one or more fastener channels extending along an outer sidewall of a side frame member forming the pedal set support frame.

In other embodiments, the pedal set support frame mounting portion may be mounted to the pedal set support frame by a fastener extending through one of the apertures defined thereon and received in a side of the pedal set support frame.

In yet other embodiments, the pedal set support frame mounting portion may be mounted to the pedal set support frame by a fastener extending outwardly from a side of the pedal set support frame and configured to be received through one of the discrete mounting points.

Advantageously, the pivot angle of the pedal set support frame may be further adjusted, beyond the discrete mounting points, by sliding the stabilising mount along the base frame relative to the adjacent mounting bracket.

In preferred embodiments, and like with the mounting brackets, the mounting assembly may include a pair of stabilising mounts for stabilising the pedal set support frame relative to the base frame on each side of the simulator cockpit.

As indicated in the tenth aspect of the present invention, in some embodiments an end cap may be operatively associated with exposed ends of frame members.

The end cap may be of any suitable size, shape and construction and may be formed from any suitable material or materials, typically plastic material or materials.

The end cap may be a substantially planar structure defined by a pair of opposed surfaces interconnected by opposing edges. The opposed surfaces may extend substantially parallel to one another and may include an outer surface and an opposed inner surface. The opposing edges may preferably include at least four edges configured to correspond with the four edges or sidewalls of the frame members.

The end cap may include at least one opening defined in at least one of the edges configured to correspond and be in fluid communication with the at least one fastener channel extending at least partially along the frame member to which it is fitted. The at least one opening may preferably be shaped to substantially match the profile contour of the at least one fastener channel.

The end cap may be fitted to an end of a frame member in any suitable way.

For example, in some embodiments, the end cap may be at least partially inserted into the end so that the end cap frictionally fits to the frame member.

In other embodiments, a connecting mechanism or part of a connecting mechanism may connect the end cap and the end of the frame member. The connecting mechanism or parts thereof may or may not be of integral formation with the end cap and the end of the frame member.

For example, in some such embodiments, the connecting mechanism may include a first part associated with the end of the frame member and a second part connectable to the first part and associated with an inner surface of the end cap.

The connecting mechanism may include mateable male and female portions that couple together, such as, e.g., a threaded connection, an interference (snap-fit) connection or a bayonet-type connection.

In some such embodiments, the first part of the connecting mechanism associated with the end of the frame member may include a male formation configured to be inserted into or coupled with a female formation of the second part of the connecting mechanism associated with the inner surface of the end cap.

In other such embodiments, the first part of the connecting mechanism may include a female formation configured to at least partially receive or be coupled with a male formation of the second part of the connecting mechanism.

In preferred embodiments, the inner surface of the end cap may include a protrusion protruding away from the inner surface and the end of the frame member may include an opening configured to at least partially receive the protrusion when the end cap is fitted to the end of the frame member.

In some such embodiments, the protrusion may include one or more retention features, such as, e.g., ridges, for preventing the end cap from being inadvertently disassociated from the end of the frame member.

In preferred embodiments, the end cap may include more than one opening defined in the edges of the end cap, each said opening configured to correspond and be in fluid communication with a fastener channel extending along a sidewall of the frame member to which the end cap is fitted. For example, in some such embodiments, the end cap may include two, three, four, five, six, seven or eight openings defined in edges of the end cap.

In some embodiments, an edge portion of the end cap may be at least partially recessed to correspond with the angled wall portion of the frame member to which it is fitted.

As indicated in the eleventh aspect of the present invention, in some embodiments, a tool holder is provided for use with the support frame assembly.

The tool holder may be of any suitable size, shape and construction to be releasably secured to a frame member of the support frame assembly and hold at least one tool. The tool holder may be formed from any suitable material or materials, typically plastic material or materials.

The tool holder may include a body having at least an outer wall, an opposed frame member engaging wall, an upper wall and an opposed lower wall.

The upper wall may include at least one opening defined therein for at least partially receiving and holding a tool, such as, e.g., a hex key and/or a ratchet. The at least one opening may preferably be complementarily shaped to the contours of the tool it is configured to receive.

In some such embodiments, an edge of the at least one opening may include one or more recessed portions shaped to complement at least part of the tool protruding from the opening.

The tool holder may be releasably secured to a frame member of the support frame assembly in any suitable way.

For example, in some embodiments, the body of the tool holder may be fastened to a frame member with one or more mechanical and/or chemical fasteners.

The one or more mechanical fasteners may include one or more threaded fasteners configured to extend through respective openings defined in the body and the frame member.

The one or more chemical fasteners may include a wet adhesive, a dry adhesive and/or double-sided adhesive tape extending between the frame member engaging wall of the body and an adjacent wall of a frame member.

In other embodiments, the tool holder may be secured to a frame member of the support frame assembly with a connecting mechanism or part thereof as previously described.

In preferred embodiments, the body of the tool holder may be slidably mounted to at least one fastening channel extending at least partially along a frame member with one or more slide fasteners as previously described. The body may include one or more apertures extending through the outer wall and/or the opposed frame member engaging wall for receiving a shank of a slide fastener therethrough and to be releasably secured thereto with a nut threadingly fastened relative to the shank.

As indicated in the twelfth aspect of the present invention, in some embodiments a cable clip is provided for use with the support frame assembly.

The cable clip may be of any suitable size, shape and construction for releasably clipping cable and securing the cable relative to the support frame assembly.

The cable clip may be formed from any suitable material or materials, typically plastic material or materials.

The cable clip may of unitary construction or may include two or more clip pieces, preferably the former.

The cable clip may include a body defining a pair of opposed clamping members configured to releasably clamp at least one cable therebetween.

The clamping members may be of any suitable size and shape, preferably like size and shape. Each clamping member may be substantially rectangular, oblong, circular, ellipsoidal or oval in shape, preferably substantially rectangular in shape.

Each clamping member may include a pair of opposed surfaces, including an inner clamping surface and an opposed outer surface. The opposed surfaces may be interconnected by opposing edges, including an outer free end edge, an opposed inner common edge and opposed side edges extending therebetween.

The opposed clamping members may preferably be joined together along the opposed inner common edge by a web configured to hold the clamping members together but enable flexion of the clamping member apart.

In some embodiments, the inner clamping surface of each clamping member may include a liner, coating or pad to at least partially assist in releasably holding a cable received therein. Typically, the liner, coating or pad may be formed from a resiliently deformable material or materials, such as, e.g., rubber or soft plastic material or materials.

In other embodiments, the inner clamping surface of each clamping member may include one or more corrugations (i.e., repeating crests and troughs) configured to assist in the releasable holding of one or more cables therein. The corrugations may preferably extend in a width-wise orientation at least partially between the inner common edge and the outer free end edge.

Like with the tool holder, the cable clip may be releasably secured to a frame member of the support frame assembly in any suitable way.

For example, in some embodiments, the body of the cable clip may be fastened to a frame member with one or more mechanical and/or chemical fasteners.

The one or more mechanical fasteners may include one or more threaded fasteners configured to extend through respective openings defined in one of the clamping members of the body and the frame member.

The one or more chemical fasteners may include a wet adhesive, a dry adhesive and/or double-sided adhesive tape extending between an outer surface of one of the clamping members of the body and an adjacent wall of a frame member.

In other embodiments, the cable clip may be secured to a frame member of the support frame assembly with a connecting mechanism or part thereof as previously described.

In preferred embodiments, the body of the tool holder may be slidably mounted to at least one fastening channel extending at least partially along a frame member. The body may be slidably mounted by a fastener portion protruding from the outer surface of one of the clamping members of the body.

The fastener portion may be of any suitable size and shape configured to be slidably mounted to the fastener channel via an end and slid into position.

The fastener portion may preferably be of unitary construction with the body.

The fastener portion may include an enlarged head and a neck interconnecting the head and the outer surface of one of the clamping members of the body. Suitably, the enlarged head may be configured to be slidable along a length of the channel but incapable of lateral separation away from the channel.

In some embodiments, the enlarged head may include a retention member for at least partially retaining the enlarged head in a desired position along a length of a fastener channel.

The retention member may be of any suitable size, shape and construction known in the art.

In some embodiments, the support frame assembly of the present invention may further include one or more feet for supporting the base frame and other components atop a support surface.

The one or more feet may be of any suitable size, shape and construction and may be operatively associated with the base frame and other components in any suitable way.

Generally, the one or more feet may be formed from a rubber or plastic material or materials, preferably plastic material or materials.

Each foot may have a support surface engaging lower wall, an opposed upper wall and at least one sidewall extending therebetween.

In some embodiments, each foot may have cylindrical shape.

In other embodiments, each foot may have cuboidal shape.

In preferred embodiments, each foot may have frusto-conical shape with a tapering sidewall extending down from the upper wall to the lower wall.

The sidewall may include a grip extending at least partially around the sidewall.

The one or more feet may be fastened to the base frame and other components in any suitable way.

For example, in some embodiments, each foot may be fastened to a frame member with one or more mechanical and/or chemical fasteners as previously described.

Likewise, in other embodiments, each foot may be fastened to a frame member with a connecting mechanism or part thereof as previously described.

In preferred embodiments, each foot may be slidably mounted to at least one fastening channel of a frame member by slide fastener or the like as previously described.

In preferred adjustments, each foot may be height adjustable by rotating the foot relative to the slide fastener, preferably using the grip provided on the sidewall of the foot.

In other embodiments, the support frame assembly of the present invention may further include one or more rollers or casters protruding from an underside of the base frame and other components.

The rollers or casters may be fastened to the base frame and other components in a similar way to the one or more feet as previously described.

According to a thirteenth aspect of the present invention, there is provided a method of assembling a support frame assembly for a racing simulator cockpit, said method including:

connecting one or more base frame members together to form a base frame of the support frame assembly, said base frame defining a forward end and an opposed rear end;

slidably mounting a pair of opposed seat brackets to opposed sides of the base frame at or near the rear end for adjustably mounting a seat, said seat brackets adapted to interchangeably mount the seat in the formula one racing configuration and the grand touring racing configuration;

slidably mounting a steering wheel assembly support frame to a location forward of the rear end and the seat brackets for supporting a steering wheel assembly relative to the base frame;

pivotally coupling a pedal support frame for having a pedal set mounted thereon at a first end to the steering wheel assembly support frame, said pedal support frame having an opposed second end pivotable between the formula one racing configuration and the grand touring racing configuration; and slidably mounting at least one pedal set support bracket to one of the opposed sides of the base frame at or near the forward end for supporting the pedal support frame, said pedal set support bracket adapted to be pivotable relative to the base frame for selectively securing the pedal support frame between the formula one racing configuration and the grand touring racing configuration.

The method may include one or more characteristics or features of the support frame assembly, the base frame member, the seat bracket, the pedal set support bracket, the seat slide assembly, the end cap, the tool holders and/or the cable clip as hereinbefore described.

The connecting may include joining a pair of side frame members extending longitudinally and substantially parallel to one another with a pair of cross frame members extending laterally relative to the side frame members and substantially parallel to one another.

The respective ends of the cross frame members may each be connected to respective end portions of the side frame members at a butt joint with one or more mechanical fasteners.

The side frame members may define the opposed sides of the base frame and the cross frame members may define the forward end and the rear end of the base frame.

The seat brackets may be directly or indirectly slidably mounted to the opposed sides of the base frame.

If directly mounted, each seat bracket may be slidably mounted to at least one fastener channel extending at least partially along a side of the base frame, preferably an outer frame sidewall of a side frame member with a slide fastener operatively associated with the channel.

If indirectly mounted, each seat bracket may be mounted to a seat slide assembly slidably mounted to the at least one fastener channel extending along the side of the base frame, preferably an outer frame sidewall of a side frame member.

The steering wheel assembly support frame may be slidably mounted forward of the seat brackets to the at least one fastener channel of each side frame member with one or more slide fasteners operatively associated with the channel.

Like with the steering wheel assembly support frame, the at least one pedal support bracket may be slidably mounted to the at least one fastener channel of one of the opposed side frame members with one or more slide fasteners operatively associated with the channel.

Typically, when the seat brackets, the steering wheel assembly support frame and/or the pedal support bracket are slid into a desired portion along the respective side frame members, the respective slide fasteners may be tightened to secure the parts in place.

According to a fourteenth aspect of the present invention, there is provided a method of adapting a support frame assembly for a racing simulator cockpit between at least two configurations corresponding to a formula one racing configuration and a grand touring racing configuration, said method including:

adjustably mounting a seat relative to a pair of opposed seat brackets such that the seat has a desired incline relative to the support frame assembly corresponding to one of the formula one racing configuration and the grand touring racing configuration;

selectively pivoting a pedal support frame to one of the formula one racing configuration and the grand touring racing configuration; and securing the pedal support frame in the one of the formula one racing configuration and the grand touring racing configuration with at least one pedal set support bracket extending upwards from a base frame, said at least one pedal set support bracket adapted to be pivotable relative to the base frame for supporting the pedal support frame.

Again, the method may include one or more characteristics or features of the support frame assembly, the base frame member, the seat bracket, the pedal set support bracket, the seat slide assembly, the end cap, the tool holders and/or the cable clip as hereinbefore described.

The adjustably mounting may include orienting the seat to a desired orientation relative to the seat brackets corresponding to one of the at least two configurations and then fastening the seat to one or more the plurality of mount points provided on the seat brackets to secure the seat in place.

In some embodiments, when interchanging the seat between configurations, the adjustably mounting may further include an initial step of unfastening the seat from the seat brackets, prior to orienting and re-fastening the seat to the seat brackets in the desired orientation to secure the seat in place.

The pivoting of the at least one pedal set support bracket may include loosening and/or removing one or more of the slide fasteners securing the at least one pedal set support bracket to the base frame, pivoting the pedal support bracket to a desired angle, and tightening and/or re-fastening the pedal support bracket to the base frame to secure the pedal support bracket in the desired angle.

In some embodiments in which the pedal set support bracket indirectly supports the pedal set via pedal support frame, the pivoting may further include sliding the bracket relative to the pedal support frame to release the frame from one of the two or more mounting or locking positions of the shaped aperture, pivoting the pedal set support bracket and/or the pedal support frame to a desired angle and/or orientation, and then securing the pedal support frame in place by slidably mounting the pedal support frame relative to the pedal set support bracket into a desired mounting or locking position of the shaped aperture of the bracket.

According to a fifteenth aspect of the present invention, there is provided a method of mounting a pedal set support frame relative to a base frame of a racing simulator cockpit, said method including:

interfacing a connection between the base frame and a steering wheel assembly support frame of the racing simulator cockpit with at least one mounting bracket;

pivotally mounting the pedal set support frame at a first end to the at least one mounting bracket such that an opposed second end is pivotable between raised and lowered positions relative the base frame; and stabilising the pedal set support frame relative to the base frame with at least one stabilising mount, said mount including a base frame mounting portion for engaging with the base frame and a pedal set support frame mounting portion extending upwardly therefrom and including a plurality of apertures defined thereon in a stacked arrangement and extending at least partially along a height of the pedal set support frame mounting portion, each aperture defining a discrete mounting point configured to selectively receive a mechanical fastener therethrough for mounting the pedal set support frame at a selected position between the raised and lowered positions relative to the base frame.

The method may include one or more characteristics or features of the mounting assembly and pedal set support frame assembly as hereinbefore described.

Any of the features described herein can be combined in any combination with any one or more of the other features described herein within the scope of the invention.

The reference to any prior art in this specification is not and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows.

DETAILED DESCRIPTION

FIGS. 1 to 21 show embodiments of a support frame assembly (100) and parts thereof for a racing simulator cockpit.

Figure 1:
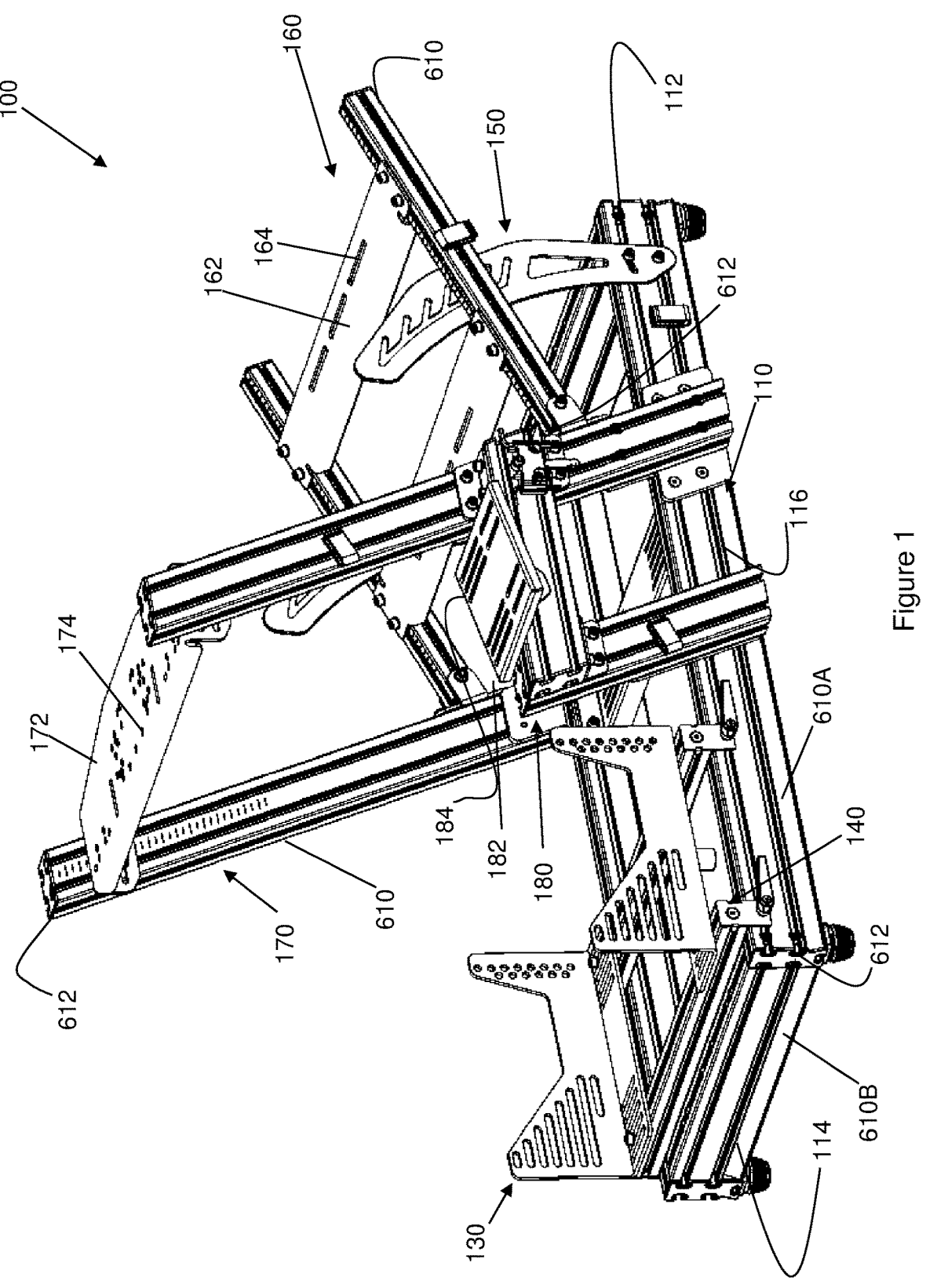
FIG. 1 is an upper perspective view of a support frame assembly for a racing simulator cockpit according to an embodiment of the present invention.

Referring to FIG. 1, the support frame assembly (100) includes: a base frame (110) defining a forward end (112), an opposed rear end (114) and opposed sides (116) extending therebetween; a pair of opposed seat brackets (130) for adjustably mounting a seat (900; not shown) extending from opposed sides (116) of the base frame (110) via a seat slide assembly (140); a pair of pedal set support brackets (150) extending upwards from the respective opposed sides (116) of the base frame (110) at or near the forward end (112) of the base frame (110) for supporting a pedal support frame (160) and a pedal set mounted thereon; and a steering wheel assembly support frame (170) extending upwardly from the opposed sides (116) of the base frame (110) at a location between the seat brackets (130) and the pedal set support brackets (150) for supporting a steering wheel assembly mounted thereon.

The seat brackets (130) are adapted to adjustably mount a seat (900; not shown) in at least two configurations including a formula one racing configuration and a grand touring ("GT") racing configuration.

Likewise, the pedal set support brackets (150) are adapted to be pivotable relative to the base frame (110) between at least two configurations including the formula one racing configuration and the GT racing configuration.

Figure 4A:
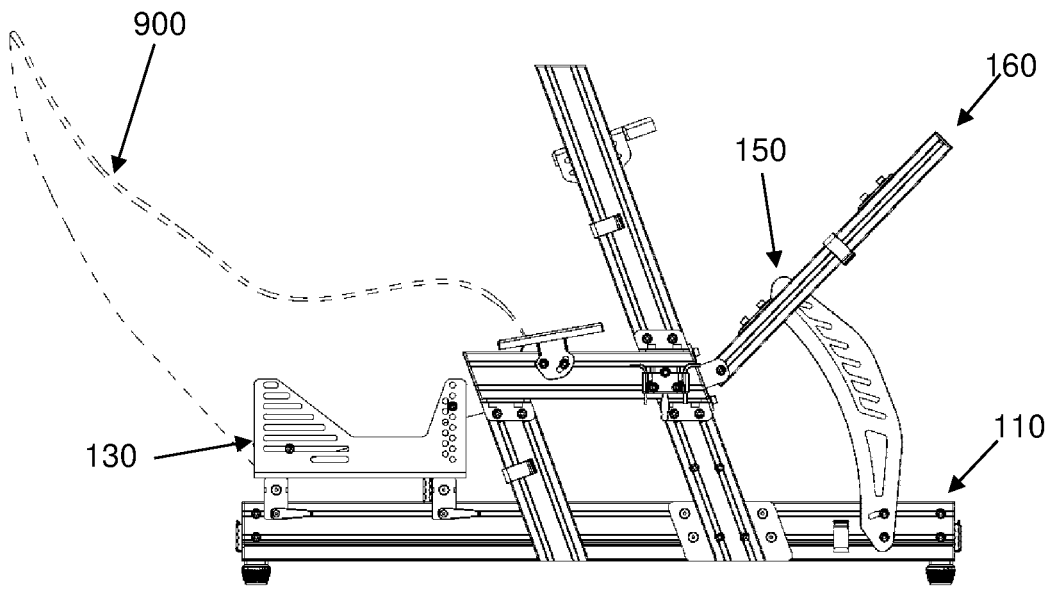
FIGS. 4A to 4C respectively show the support frame assembly shown in FIGS. 1 to 3 in a formula one racing configuration, a grand touring ("GT") racing configuration and a hybrid racing configuration.
Figure 4B:
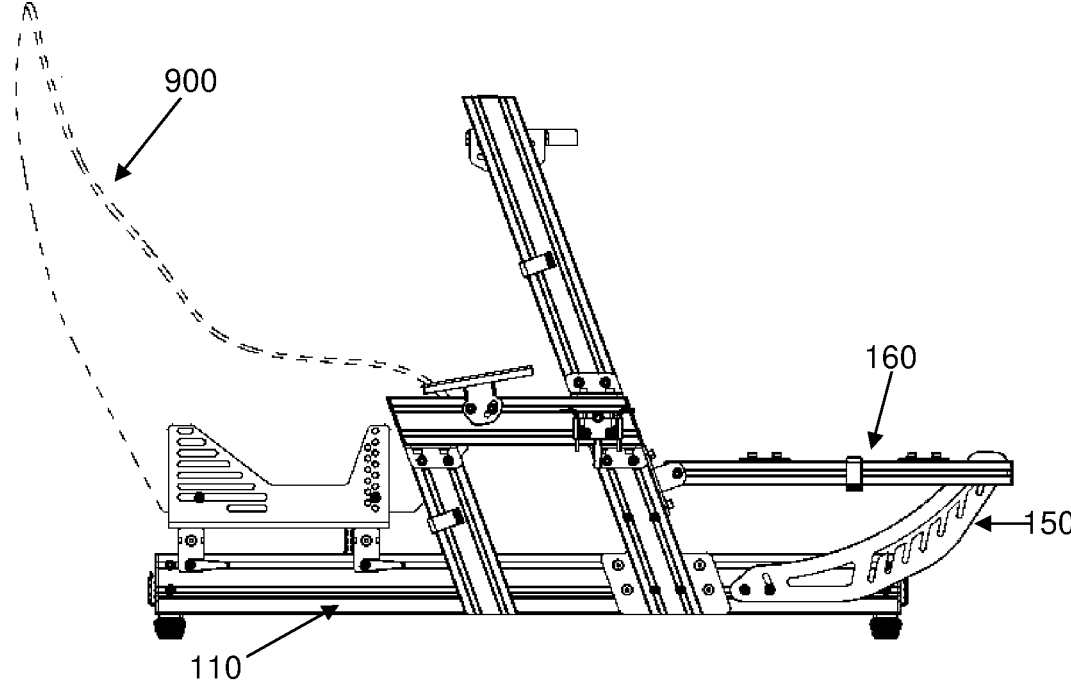
Figure 4C:
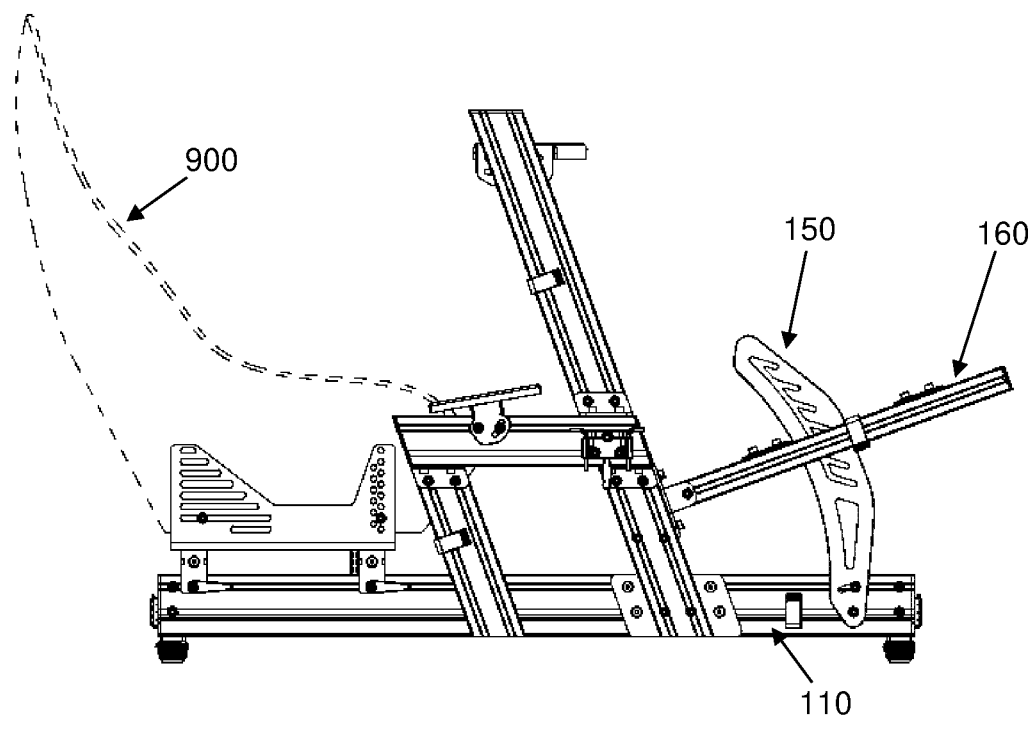

FIGS. 4A to 4C illustrate the respective racing configurations, including a third configuration directed to a hybrid racing configuration.

Referring briefly to FIG. 4A, the "formula one racing configuration" is characterised by a cockpit configuration in which the seat (900) is angled rearwards by the seat brackets (130) relative to the base frame (110) at an angle of about 120° or greater and the pedal support brackets (150) extend substantially vertically upwards from the base frame (110) such that the pedal support frame (160) extends at angle of about 45° or greater relative to base frame (110).

Referring briefly to FIG. 4B, the "GT racing configuration" is characterised by a cockpit configuration in which the seat (900) is more upright compared to the formula one racing configuration, typically having an angle of less than 120° relative to the base frame (110). Further, the pedal support brackets (150) extend substantially forward from the base frame (110) such that the pedal support frame (160) extends in a substantially horizontal orientation.

Referring briefly to FIG. 4C, this figure shows a "hybrid racing configuration" characterised by having the seat (900) mounted at the same or a similar orientation as the GT racing configuration but the pedal set support brackets (150) extend substantially vertically as in the formula one racing configuration with the pedal support frame (160) extending forward at an angle of about 45° or greater relative to the base frame (110).

Referring back to FIG. 1, the base frame (110), the pedal support frame (160), the wheel assembly support frame (170) and other components of the support frame assembly (100) are formed by various frame members (610) joined together.

Figures 6, 7, 8:
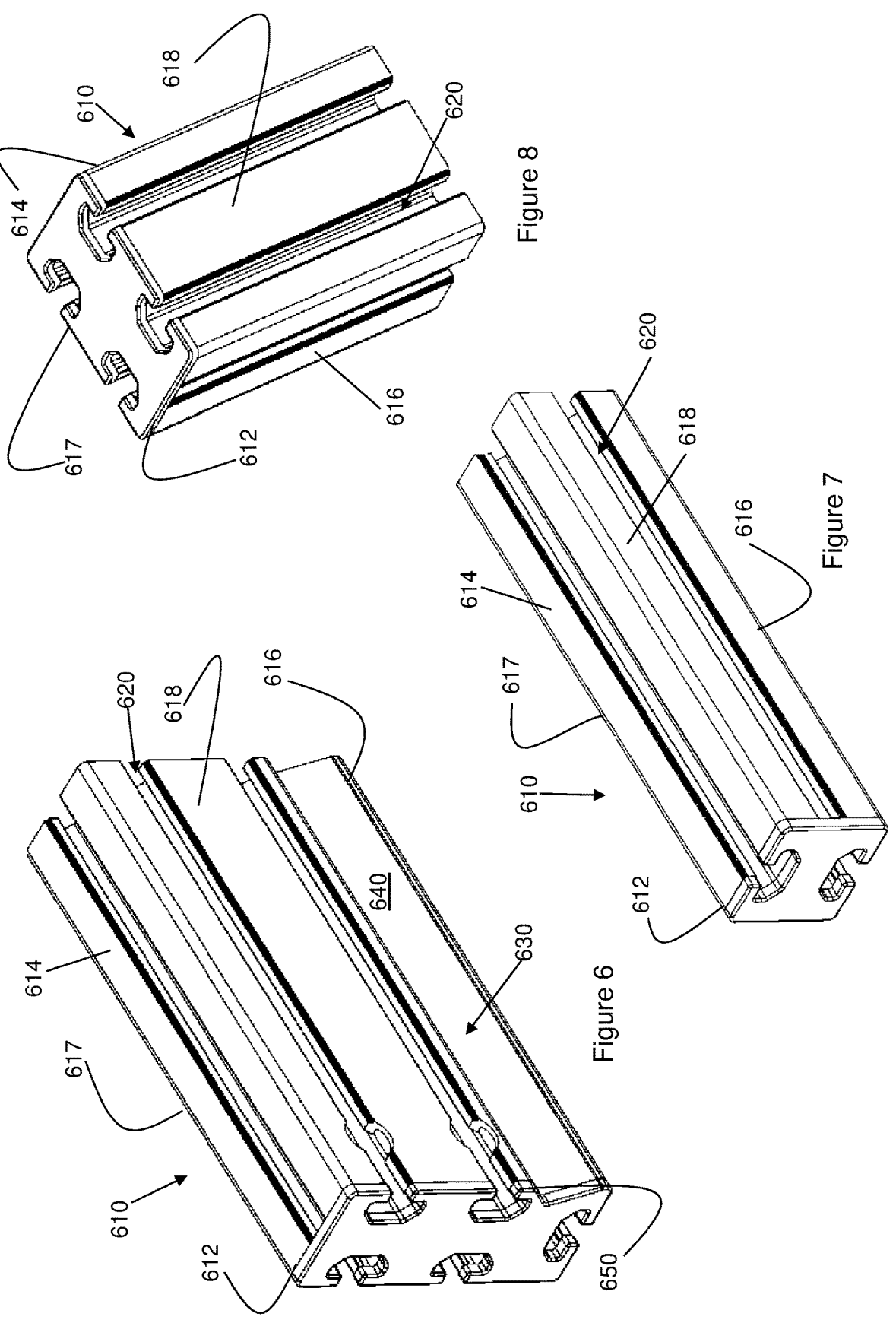
FIGS. 6 to 8 respectively show perspective views of various frame members used to assemble the support frame assembly shown in FIGS. 1 to 3.

FIGS. 6 to 8 illustrate the various frame members (610) with FIG. 6 showing a frame member (610) used to assemble the base frame (110; not shown); FIG. 7 showing a frame member (610) use to assemble the pedal support frame (160; not shown); and FIG. 8 showing a frame member (610) used to assemble the wheel assembly support frame (170; not shown).

Referring to FIGS. 6 to 8 generally, each frame member (610) is of tubular construction having a substantially rectangular cross section.

Each frame member (610) includes a pair of opposed ends (612) and an elongate body having at least four sidewalls extending therebetween. The four sidewalls include an upper sidewall (614), an opposed lower sidewall (616), an inner frame sidewall (617) and an opposed outer frame sidewall (618).

Each frame member (610) further includes at least one fastener channel (620) extending along each sidewall entirely between the opposed ends (612) for receiving one or more fasteners for fastening assembly components to the respective frame members (610).

Each channel (620) has a T-shaped profile shape sized and shaped to enable a fastener to be slid along the channel (620) but prevent lateral movement or separation of the fastener away from the channel (620).

Generally, the fastener is a slide fastener configured to be slidably mounted to the channel (620) for releasably securing components thereon.

The fastener includes an enlarged head, a shank extending away from the head and a nut configured to be fastened relative to the shank for securing components thereon and for securing the fastener in place relative to the channel (620).

The enlarged head is configured to be slidably mounted to the channel (620) via an end (612) and slid into position. The head is sized and shaped to be slidable along a length of the channel (620) but incapable of lateral separation away or disengagement from the channel (620).

The shank includes a threaded shank portion, and the nut is configured to be threadingly fastened to the threaded portion of the shank. The nut may be wing nut or may include one or more handles extending away from the nut to facilitate tightening and loosening of the nut relative to the shank.

As shown, some of the frame members (610) include more than one fastener channel (620) extending along a sidewall. For example, and with reference to FIGS. 6 and 8, each of these frame members (610) includes two fastener channels (620) arranged substantially parallel to one another and extending along the inner and outer frame sidewalls (617, 618).

Further, and with specific reference to FIG. 6, the frame member (610) for the base frame (110; not shown) also includes a receiving opening (630) defined by an angled wall portion (640) extending inwards from an edge adjacent the lower sidewall (616) and the outer frame sidewall (618) to define a groove (650) for receiving lighting therein, typically an LED lighting strip.

The receiving opening (630) and the groove (650) extend an entire length of the frame member (610).

The angled wall portion (640) extends inwards from the edge at an angle of about 70° relative to the lower sidewall (616).

Advantageously, the inclusion of strip lighting in the groove (650) enhances the aesthetic appeal of the racing simulator cockpit and the racing/gaming experience.

Further, signage may be applied on an outer surface of the angled portion (640).

Advantageously, by being angled, any signage applied thereon is readily viewable, particularly when illuminated by lighting located immediately above.

Figure 5:
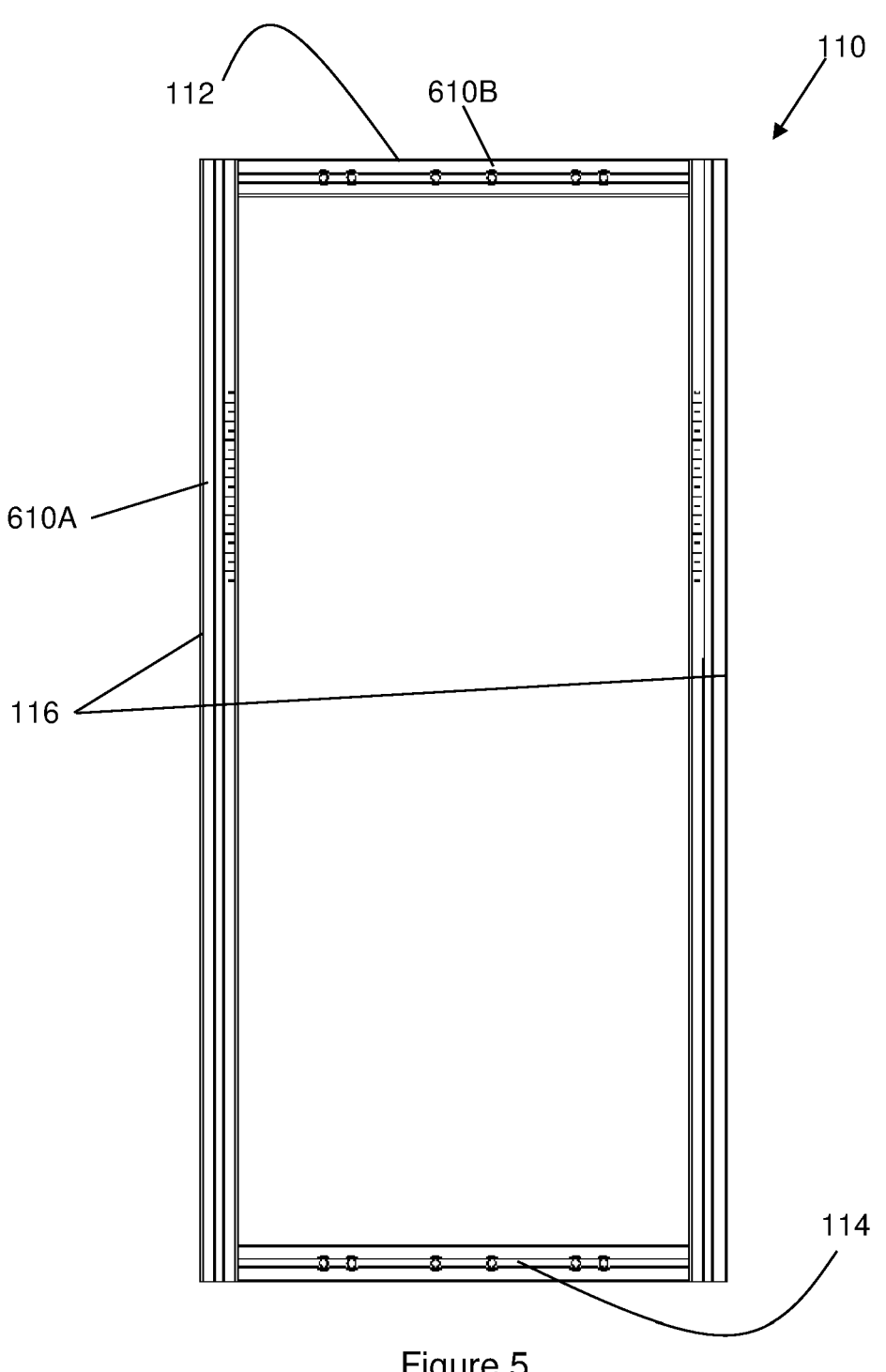
FIG. 5 is a plan view of a base frame of the support frame assembly shown in FIGS. 1 to 3.

Referring to FIG. 5, and as previously indicated, the base frame (110) supports the support assembly (100; not shown) relative to a support surface and defines a forward end (112), an opposed rear end (114) and opposed sides (116) of the support assembly (100; not shown).

The frame (110) has a substantially rectangular shape and is formed from four frame members (610) joined together, including a pair of opposed side frame members (610A) extending longitudinally and substantially parallel to one another and joined together by a pair of cross frame members (610B) extending laterally relative to the side frame members (610A) and substantially parallel to one another. The frame members (610) correspond to the frame member shown in FIG. 6.

The cross frame members (610B) and side frame members (610A) are joined together at a butt joint with one or more mechanical fasteners.

Specifically, and referring back to FIG. 1, the end portion of each side frame member (610A) includes a pair of opening at or near the end (612) and the end (612) of each cross frame member (610B) includes corresponding openings configured to align with the openings in the side frame members (610A) and receive mechanical fasteners therethrough for joining the frame members (610) together.

Figure 10:
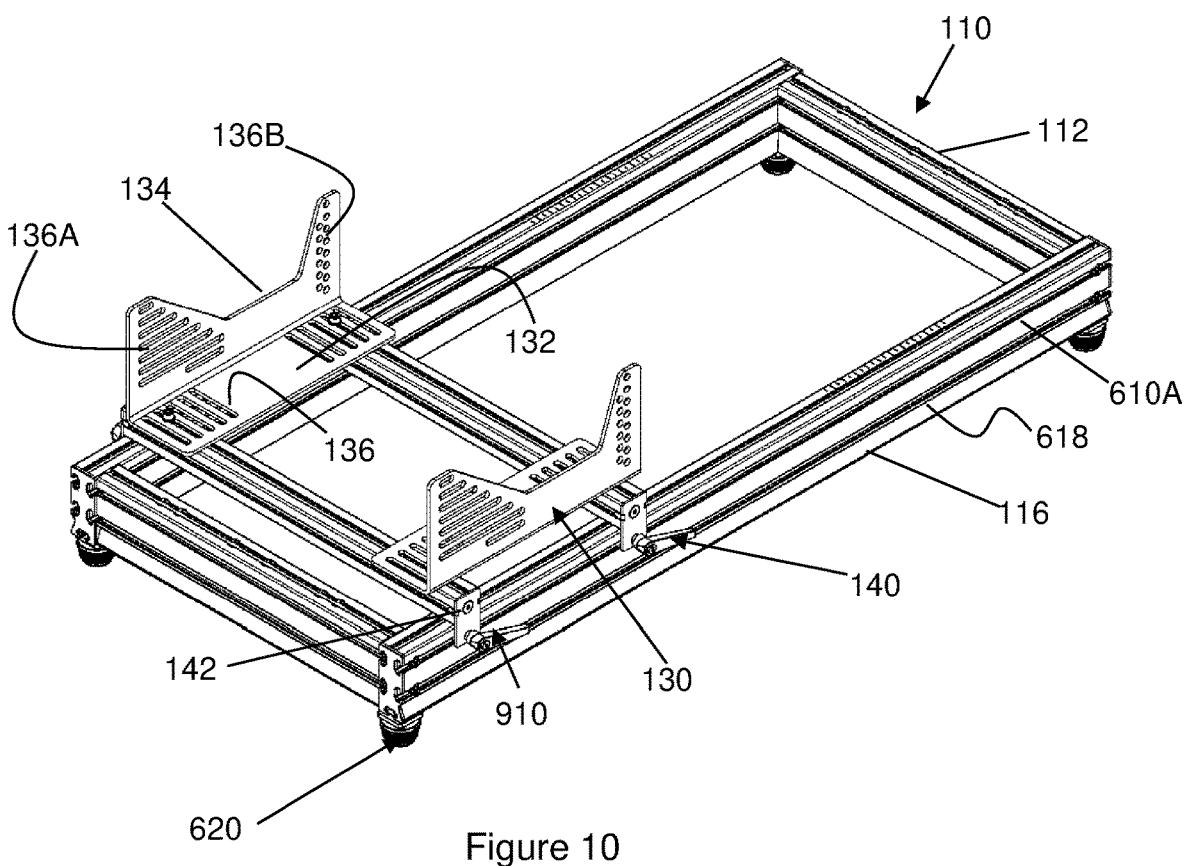
FIG. 10 is an upper perspective view of the seat slide assembly and seat brackets as shown in FIG. 9 slidably mounted to the base frame of the support frame assembly shown in FIGS. 1 to 3.

Referring to FIG. 10, the seat brackets (130) extend from opposed sides (116) of the base frame (110) for adjustably mounting a seat (900; not shown).

The seat brackets (130) are slidably mounted to the base frame (110) via a seat slide assembly (140) configured to enable the seat (900; not shown) to be selectively moved forwards and/or backwards relative to the forward end (112) of the support assembly (100; not shown).

Each seat bracket (130) has a substantially L-shaped cross section having a frame engaging portion (132) that is fastened to the seat slide assembly (140) and a seat engaging portion (134) adapted to be fastened to a seat (900; not shown). The frame engaging portion (132) and seat engaging portion (134) are orthogonally angled relative to one another along a common edge.

Each bracket (130) extends longitudinally between a rear-facing edge and an opposed forward-facing edge.

Both portions (132, 134) include a plurality of apertures (136) respectively defined thereon for receiving one or more mechanical fasteners therethrough for fastening the bracket (130) to the seat (900; not shown) and the seat slide assembly (140), respectively.

The frame engaging portion (132) includes a plurality of elongate apertures (136) extending longitudinally in a direction perpendicular to a longitudinal axis of the bracket (130).

The seat engaging portion (134) includes a plurality of elongate apertures (136A) defined at or near the rear-facing edge and extending in a stacked arranged along a height of the portion (134) and plurality of substantially circular apertures (136B) defined at or near the forward-facing edge and extending in a stacked arrangement along the height of the portion (134). In use, the combination of apertures (136A, 136B) provides a plurality of mount points for adjustably and precisely mounting a seat (900; not shown) at a desired angle relative to the base frame (110) corresponding to at least one of the race configurations.

Figure 9:
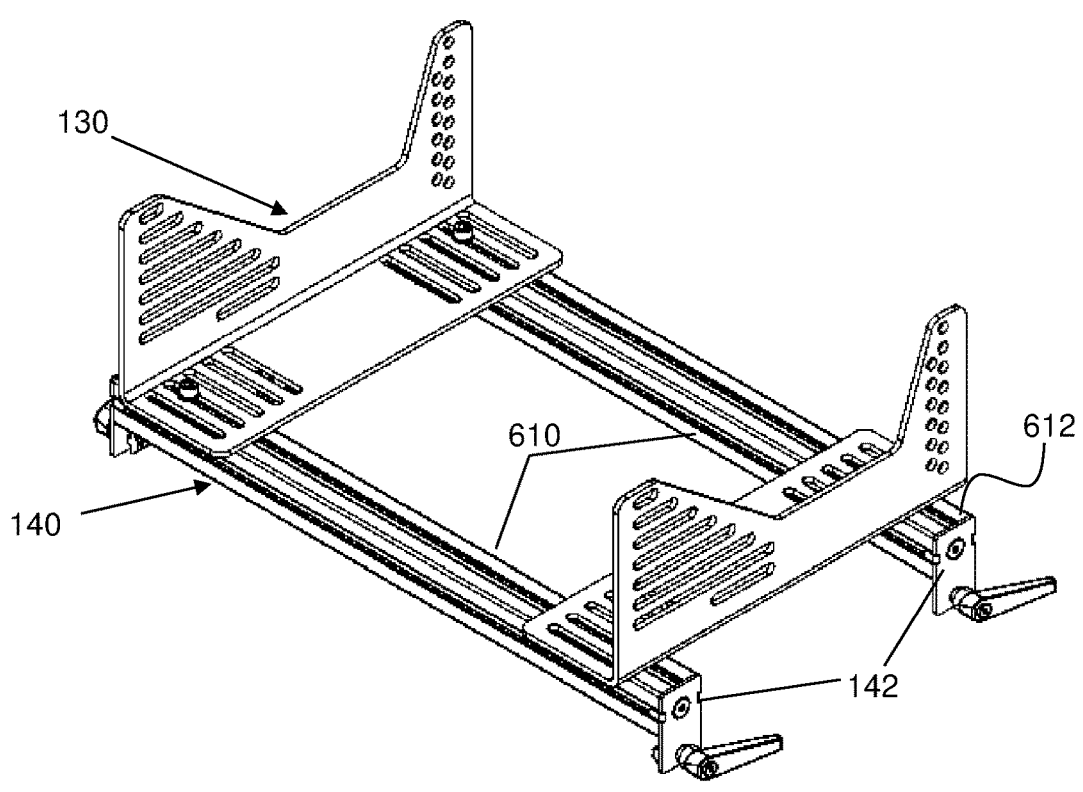
FIG. 9 is an upper perspective view of a seat slide assembly according to an embodiment of the present invention fitted to a pair of seat brackets.

Referring to FIG. 9, and as indicated, the seat brackets (130) are slidably mounted to the base frame (110; not shown) via a seat slide assembly (140).

The seat slide assembly (140) includes two pairs of slide brackets (142) each interconnected by a frame member (610; as shown in FIG. 7) extending therebetween and atop of which the seat brackets (130) are mounted at or near the opposed ends (612) of the frame members (610).

Referring again to FIG. 10, the slide brackets (142) of the seat slide assembly (140) are slidably mounted to the fastener channels (620) extending along the outer frame sidewall (618) of the side frame members (610A) forming the base frame (110) and releasably secured in place by tightening the nuts of the fasteners (910).

Referring back to FIGS. 2 and 3, the pedal set support brackets (150) extend upwards from opposed sides (116) of the base frame (110) at or near the forward end (112) for supporting a pedal support frame (160) and a pedal set mounted thereon.

Each bracket (150) is fastened to at least one of the fastener channels (620) extending along the outer frame sidewall (618) of the side frame members (610A) forming the base frame (110) and is pivotable relative to the base frame (110) between the race configurations.

Generally, each bracket (150) has an elongate planar shape, including an inner surface and an opposed outer surface. The opposed surfaces extend substantially parallel to one another and are interconnected by opposing edges.

Each bracket (150) includes opposed ends, including a base frame mounting end (152) and an opposed pedal set engaging end (154). The bracket (150) extends longitudinally between the opposed ends in an arc curving backwards towards the rear end (114) of the base frame (110).

The base frame mounting end (152) includes a plurality of apertures (153) defined thereon for receiving one or more mechanical fasteners therethrough for fastening the bracket (150) to at least one of the fastener channels (620). The apertures (153) include arc shaped apertures (153) to advantageously facilitate pivoting of the bracket (150) between the configurations or adjusting a position of the pedal set.

The pedal set engaging end (154) includes a shaped aperture (155) defining two or more mounting or locking positions for mounting or locking the pedal support frame (160) at a desired orientation relative to the base frame (110).

The shaped aperture (155) includes an elongate aperture portion (156) extending partially towards the base frame mounting end (152) and includes two or more mounting or locking aperture portions (157) corresponding to the mounting or locking positions. The two or more mounting or locking aperture portions (157) branch off the elongate aperture portion (156) at an angle and in a spaced arrangement relative to one another for slidably receiving one or more slide fasteners protruding outwardly from the pedal support frame (160) and mounting or locking the pedal support frame (160) at a desired orientation relative to the at least one bracket (150).

Referring to FIG. 1 again, the pedal support frame (160) is sized and shaped to have a pedal set mounted thereon and be slidably mounted to the pedal set support brackets (150).

The pedal support frame (160) includes a pair of opposed side frame members (610; as shown in FIG. 7) pivotally coupled at one end (612) to the steering wheel assembly support frame (170) and joined together by two support brackets (162) having apertures (164) defined thereon for receiving one or more mechanical fasteners therethrough for fastening a pedal set mounted thereon to the brackets (162).

Together with the pedal set support brackets (150), the pedal support frame (160) is pivotable between race configurations corresponding to the formula one and GT racing configurations as shown in FIGS. 4A and 4B, respectively.

The steering wheel assembly support frame (170) extends upwardly from the base frame (110) at location between the seat brackets (130) and the pedal support brackets (150) for supporting a steering wheel assembly.

The support frame (170) includes a pair of opposed frame members (610; as shown in FIG. 8) extending upwardly from opposed sides (116) of the base frame (110) and a support bracket (172) extending between upper ends (612) of the frame members (610) for having the steering wheel assembly mounted thereon.

The support bracket (172) includes a plurality of apertures (174) for receiving one or more mechanical fasteners therethrough for fastening a steering wheel assembly mounted thereon to the bracket (172).

Figure 2:
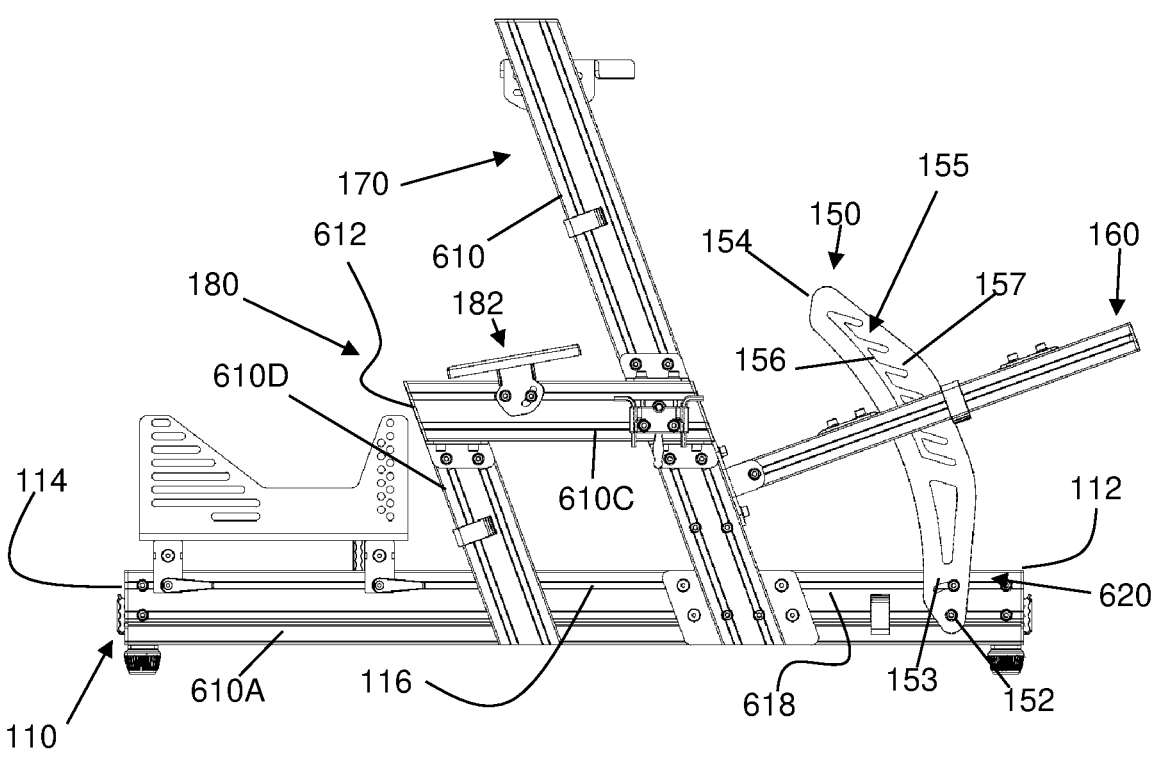
FIG. 2 is a side view of the support frame assembly shown in FIG. 1.
Figure 3:
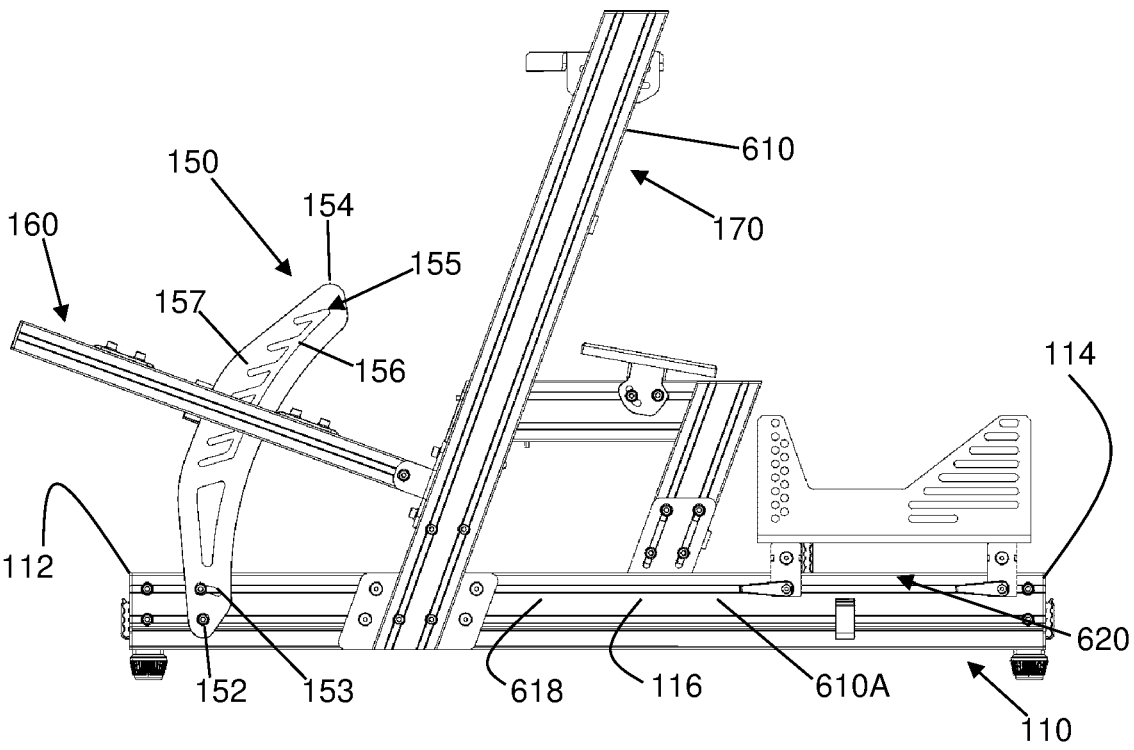
FIG. 3 is an opposite side view of the support frame assembly shown in FIG. 2.

Best shown in FIGS. 2 and 3, the frame members (610) of the support frame (170) extend upwardly from the base frame (110) at an angle of about 110° relative to the forward end (112) of the base frame (110) for supporting the steering wheel assembly at an optimal height and position relative to a seat (900; not shown) mounted to the seat brackets (130).

Referring to FIG. 2, the steering wheel assembly support frame (170) further includes a subframe (180) for supporting a gear stick shifter assembly and/or a handbrake support assembly.

The subframe (180) extends from one side (116) of the base frame (110) and includes a first frame member (610C) extending rearwardly from an outer frame sidewall (618) of the steering wheel assembly support frame (170), and a second frame member (610D) extending downwardly from a rearmost end (612) of the first frame member (610C).

The first and second frame members (610C, 610D) are joined together and respectively joined to the steering wheel assembly support frame (170) and a side frame member (610A) of the base frame (110) via a fastener channel (620) and slide fastener arrangement as hereinbefore described.

The subframe (180) further includes a mounting bracket (182) configured to be fastened atop the first frame member (610C) for having the gear stick shifter assembly and/or handbrake support assembly mounted thereon. The bracket (182) includes apertures (184; shown in FIG. 1) defined thereon for receiving one or more mechanical fasteners therethrough for fastening the gear stick shifter assembly and/or handbrake support assembly mounted thereon to the bracket (182).

FIGS. 11A, 11B, 12A, 12B, 13A and 13B respectively show embodiments of an end cap (1100) for an end (612, not shown) of a frame member (610; not shown).

Figure 11A:
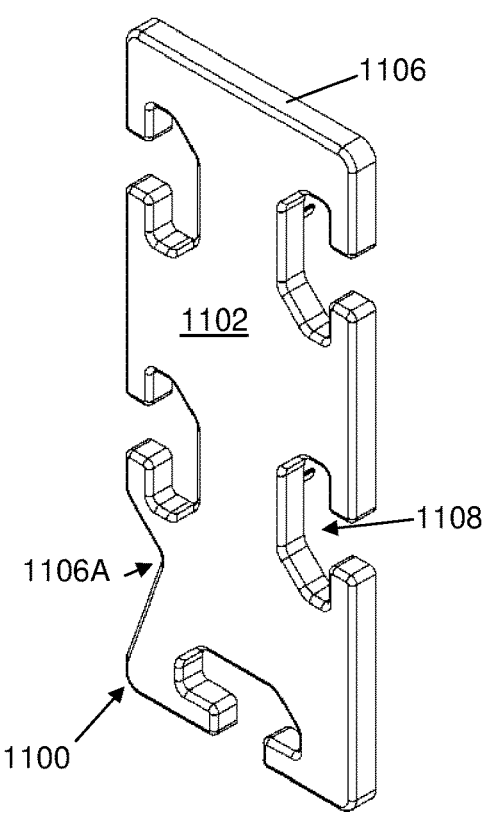
FIGS. 11A and 11B respectively show perpendicular views of opposite sides of an end cap for an end of a frame member according to an embodiment of the present invention.
Figure 11B:
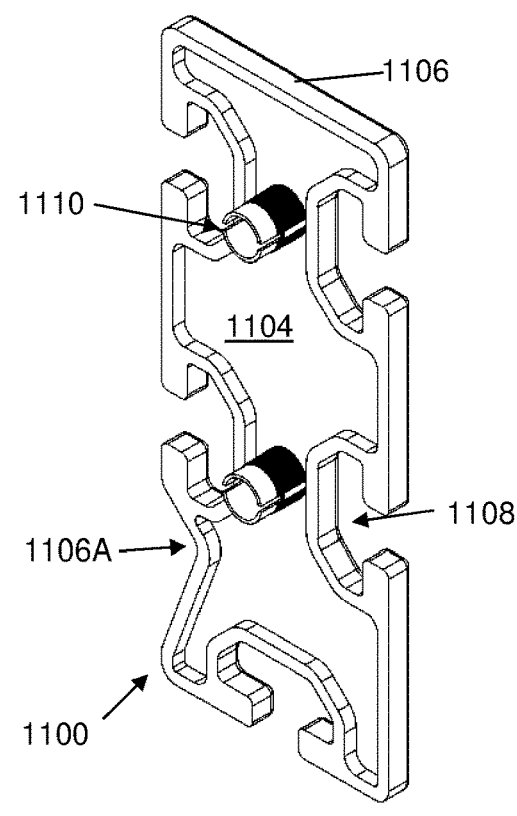

Referring to FIGS. 11A and 11B, the end cap (1100) is a substantially planar structure defined by a pair of opposed surfaces interconnected by opposing edges (1106).

The opposed surfaces extend substantially parallel to one another and include an outer surface (1102; shown in FIG. 11A) and an opposed inner surface (1104; shown in FIG. 11B).

The edges (1106) include four edges configured to correspond with the edges or sidewalls of the frame members (610; not shown).

The end cap (1100) includes a plurality of openings (1108) defined along the edges (1106) configured to correspond and be in fluid communication with the fastener channels (620; not shown) extending along the frame members (610; not shown) to which the end cap (1100) is fitted.

Advantageously, the openings (1108) substantially match the profile contours of the fastener channels (620) against which they align when the end cap (1100) is fitted to an end (612; not shown) of a frame member (610; not shown), so that a slide fastener can be inserted into, or removed from, the fastener channel (620; not shown) without the end cap (1100) being removed.

Referring to FIG. 11B, the inner surface (1104) of the end cap (1100) includes at least one protrusion (1110) protruding away from the inner surface (1104) and configured to align with and be at least partially received in at least one corresponding opening defined in the end (612; not shown) of a frame member (610; not shown) to which the end cap (1100) is fitted.

Engagement of the protrusion (1110) in a corresponding opening assists in preventing the end cap (1100) from being inadvertently disassociated from the end (612; not shown) of a frame member (610).

FIGS. 11A and 11B show an embodiment of an end cap (1100) configured to be fitted to an end (612) of a frame member (610) as shown in FIG. 6.

The end cap (1100) of this embodiment further includes a partially recessed edge portion (1106A) configured to correspond with the angled wall portion (640) of the frame member (610) shown in FIG. 6 to which it is fitted.

Figure 12A:
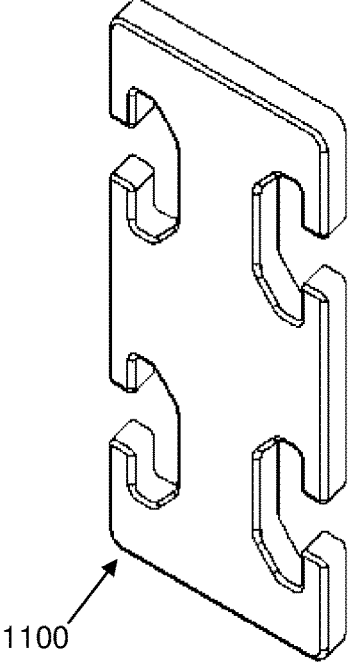
FIGS. 12A and 12B respectively show perpendicular views of opposite sides of an end cap for an end of a frame member according to another embodiment of the present invention.
Figure 12B:
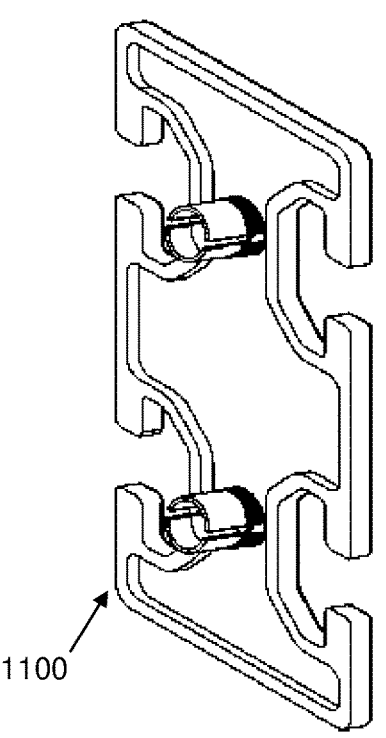

FIGS. 12A and 12B show an embodiment of the end cap (1100) configured to be fitted to an end (612) of a frame member (610) as shown in FIG. 8.

Figure 13A:
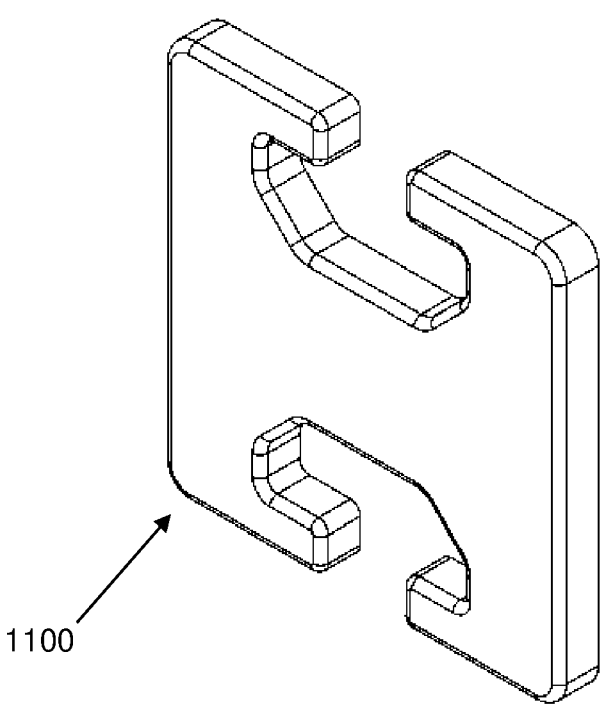
FIGS. 13A and 13B respectively show perpendicular views of opposite sides of an end cap for an end of a frame member according to yet another embodiment of the present invention.
Figure 13B:
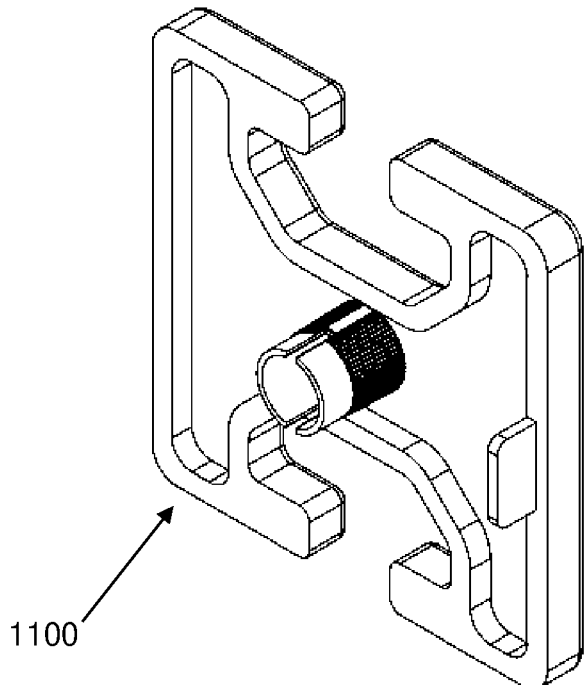

FIGS. 13A and 13B show an embodiment of the end cap (1100) configured to be fitted to an end cap (612) of a frame member (610) as shown in FIG. 7.

Figure 14:
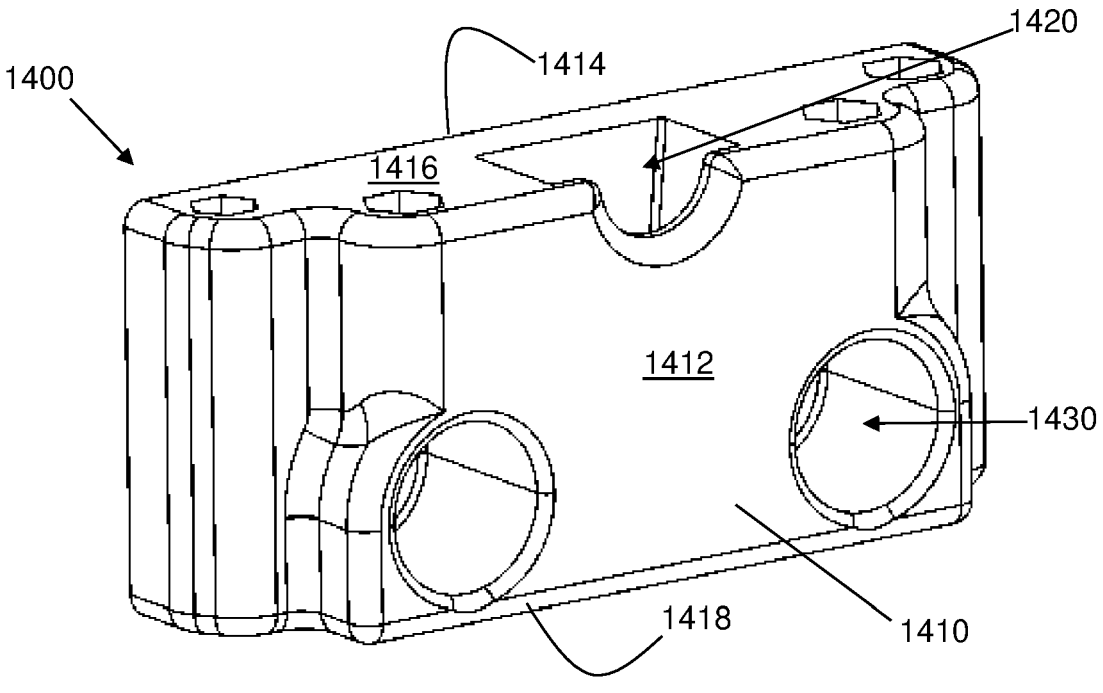
FIG. 14 is an upper perspective view of a tool holder according to an embodiment of the present invention for attachment to the support frame assembly shown in FIGS. 1 to 3.
Figure 15:
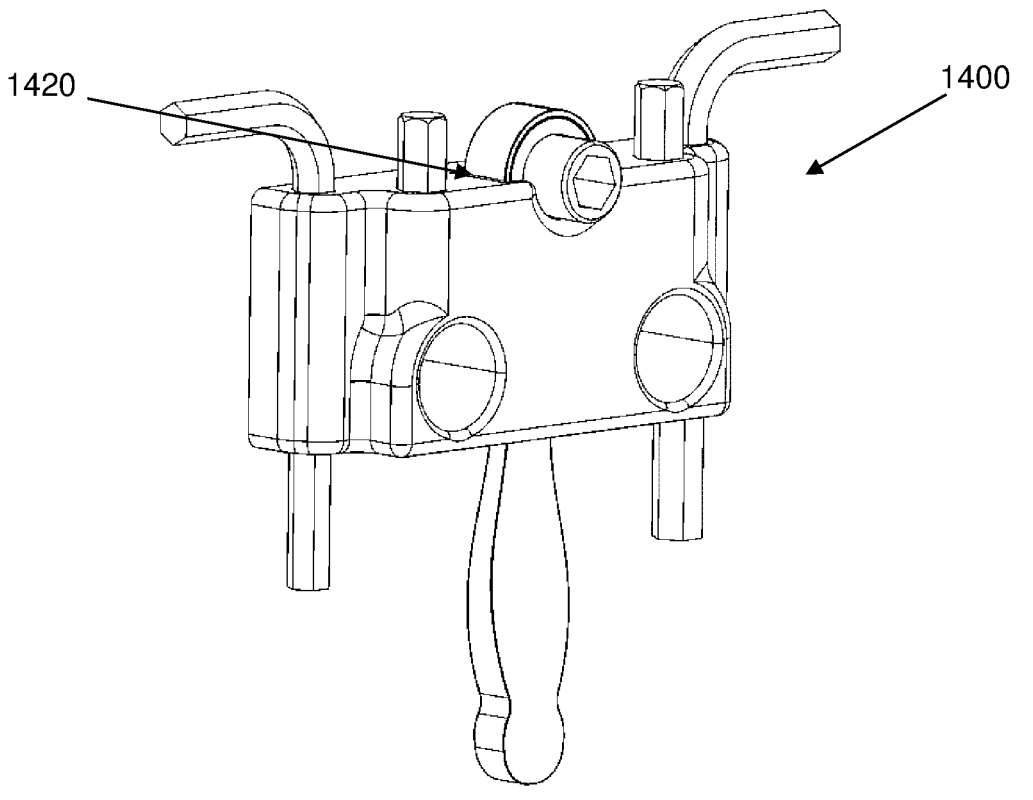
FIG. 15 is an upper perspective view of the tool holder shown in FIG. 14 with tools fitted.

FIGS. 14 and 15 show a tool holder (1400) for use with the support frame assembly (100) shown in FIG. 1.

Referring to FIG. 14, the tool holder (1400) includes a body (1410) having an outer wall (1412), an opposed inner wall (1414), an upper wall (1416) and an opposed lower wall (1418).

As shown, the upper wall (1416) includes one or more shaped openings (1420) for at least partially receiving and holding one or more tools, such as, e.g., a hex key and/or a ratchet.

Referring to FIG. 15, the shaped openings (1420) are each complementary shaped to the contours of the tool they are configured to receive and hold.

Referring back to FIG. 14, the body (1410) of the tool holder (1400) includes a pair of apertures (1430) extending through the inner and outer walls (1412, 1414) each for receiving a shank of a slide fastener therethrough and to be releasably secured thereto with a nut threadingly engaging with the shank. The slide fasteners are slidably mounted to a fastener channel (620; not shown) of an adjacent frame member (610; not shown).

Figure 16:
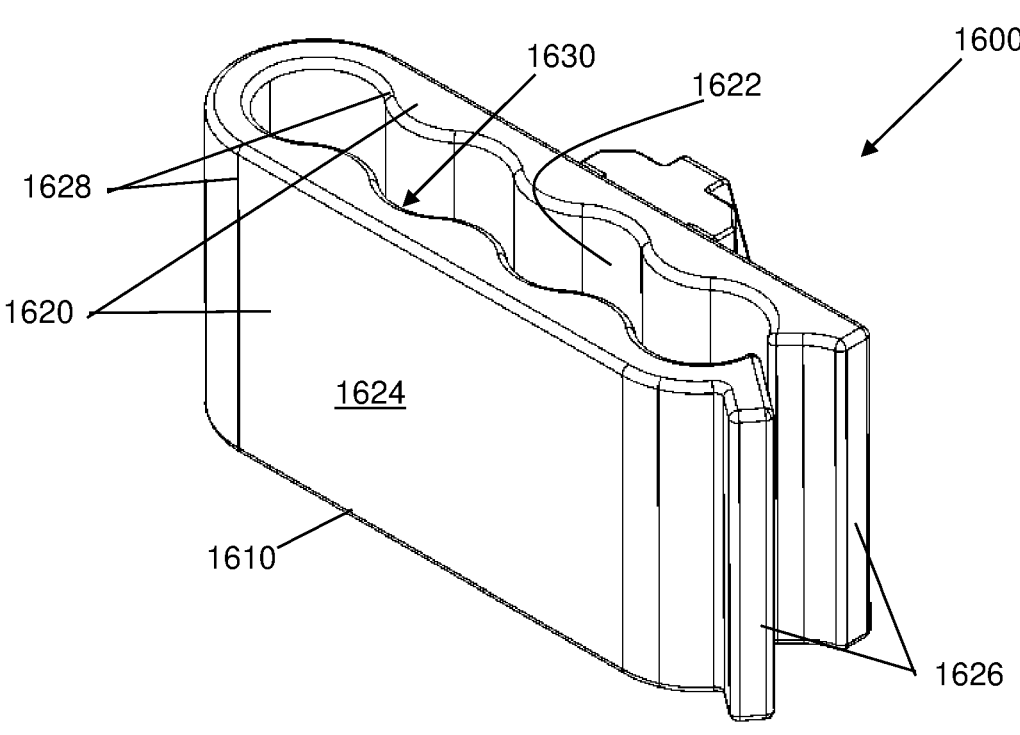
FIG. 16 is a forward perspective view of a cable clip according to an embodiment of the present invention for attachment to the support frame assembly shown in FIGS. 1 to 3.
Figure 17:
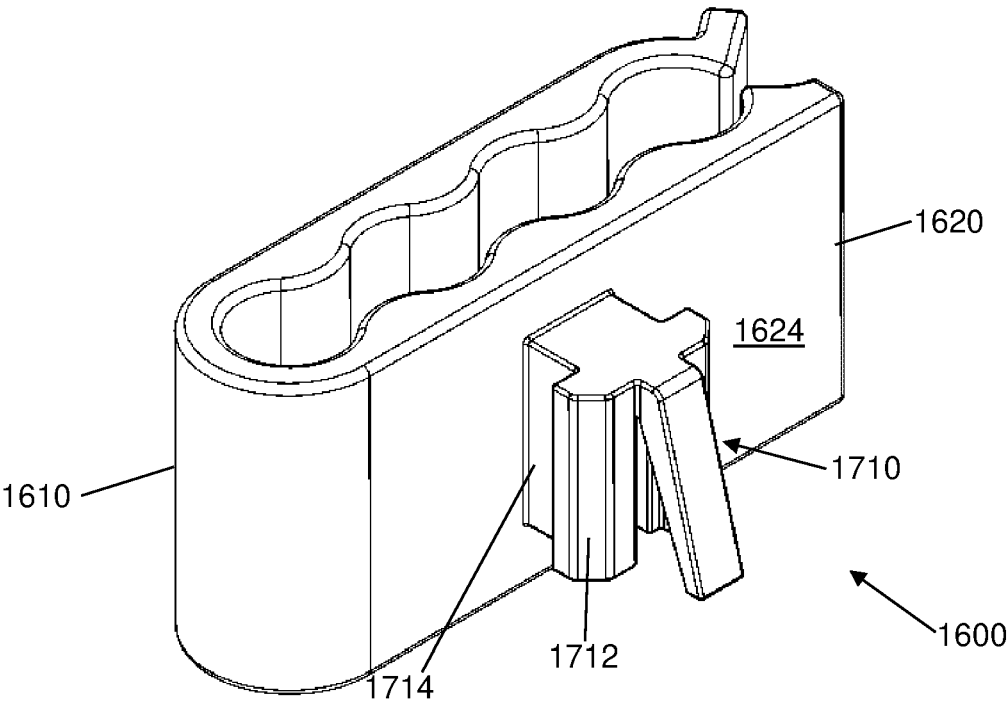
FIG. 17 is a rear perspective view of the cable clip shown in FIG. 16.

FIGS. 16 and 17 show a cable clip (1600) according to an embodiment of the present invention for releasably holding and tidying one or more cables relative to the support frame assembly (100; not shown).

Referring to FIG. 16, the cable clip (1600) includes a body (1610) defining a pair of opposed clamping members (1620) configured to releasably clamp one or more cables therebetween.

The clamping members (1620) each have a substantially rectangular shape.

Each clamping member (1620) includes a pair of opposed surfaces, including an inner clamping surface (1622) and an opposed outer surface (1624).

The opposed surfaces are interconnected by opposing edges, including an outer free end edge (1626), an opposed inner common edge (1628) and opposed side edges (1629) extending therebetween.

The opposed clamping members (1620) are joined together along the opposed inner common edge (1628) by a web configured to hold the clamping members (1620) together but enable flexion of the clamping members apart (1620) for receiving and/or removing cables from the clip (1600).

As shown, the inner clamping surface (1622) of each clamping member (1620) includes one or more corrugations (1630 i.e., repeating crests and troughs) configured to assist in releasably holding the one or more cables therein. The corrugations (1630) extend width-wise at least partially between the inner common edge (1628) and the outer free end edge (1626).

Referring to FIG. 17, the cable clip (1600) is configured to be releasably secured to a frame member (610; not shown) of the support frame assembly (100; not shown). In this regard, the body (1610) of the tool holder (1600) includes a fastener portion (1710) configured to be slidably mounted to a fastener channel (620; not shown) of an adjacent frame member (610; not shown).

The fastener portion (1710) protrudes from the outer surface (1624) of one of the clamping members (1620), typically the rearmost.

The fastener portion (1710) includes an enlarged head (1712) and a neck (1714) interconnecting the head (1712) and the outer surface (1624) of the clamping member (1620). The enlarged head (1712) is configured to be slidable along a fastener channel (620; not shown) of a frame member (610; not shown) but incapable of lateral separation away from the channel (620; not shown).

Figure 18:
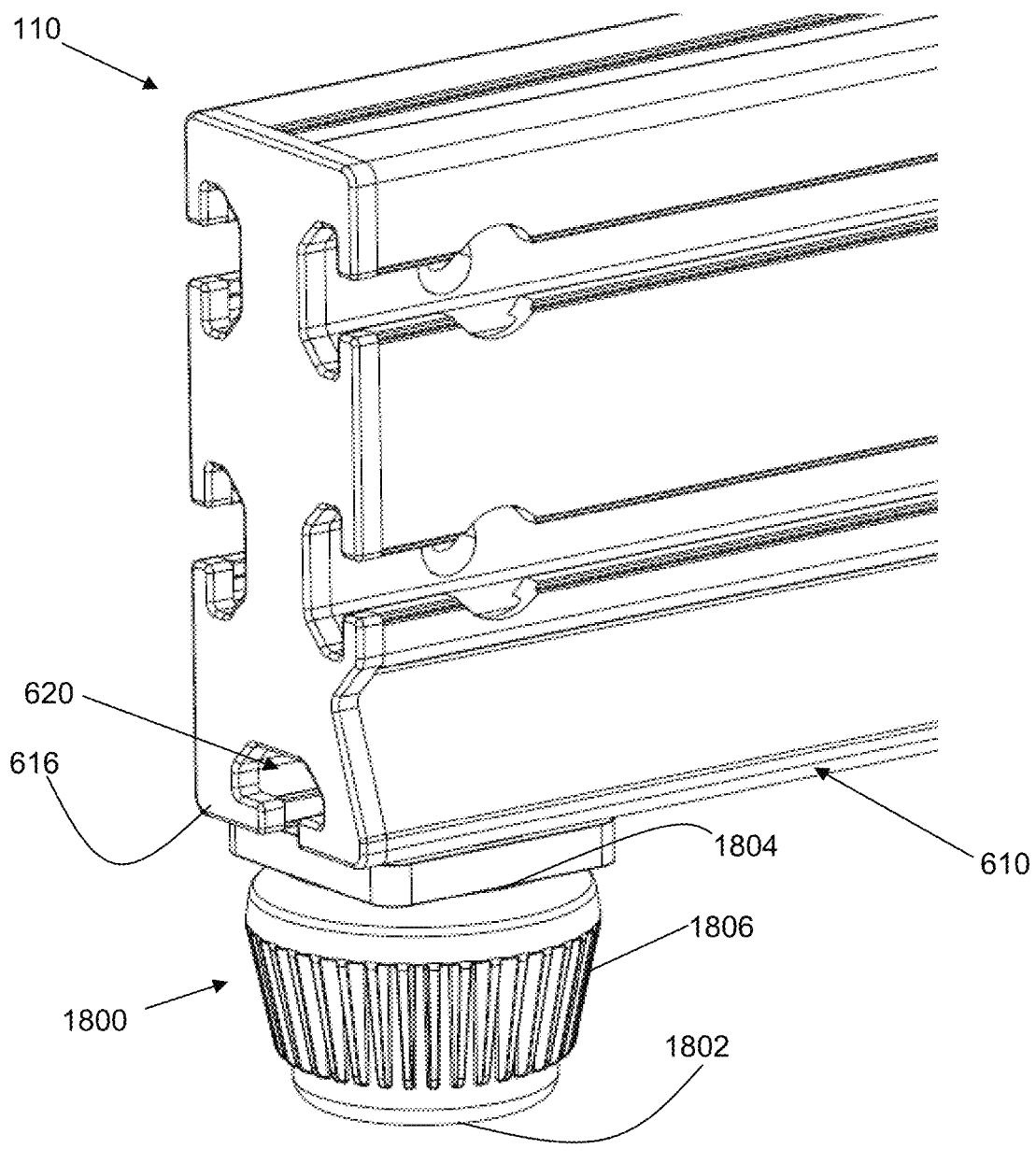
FIG. 18 is an upper perspective view showing a magnified view a foot attached to the support frame assembly shown in FIGS. 1 to 3.

Referring to FIG. 18, in some embodiments the support frame assembly (100; not shown) includes one or more feet (1800) for supporting the base frame (110) atop a support surface.

The feet (1800) are formed from a rubber or plastic material or materials.

As shown, each foot (1800) has a support surface engaging lower wall (1802), an opposed upper wall (1804) and a frustoconical tapering sidewall (1806) extending therebetween.

Each foot (1800) is slidably mounted to a fastener channel (620) extending along the lower sidewall (616) of any lowermost frame member (610) with a slide fastener as previously described.

Figure 19:
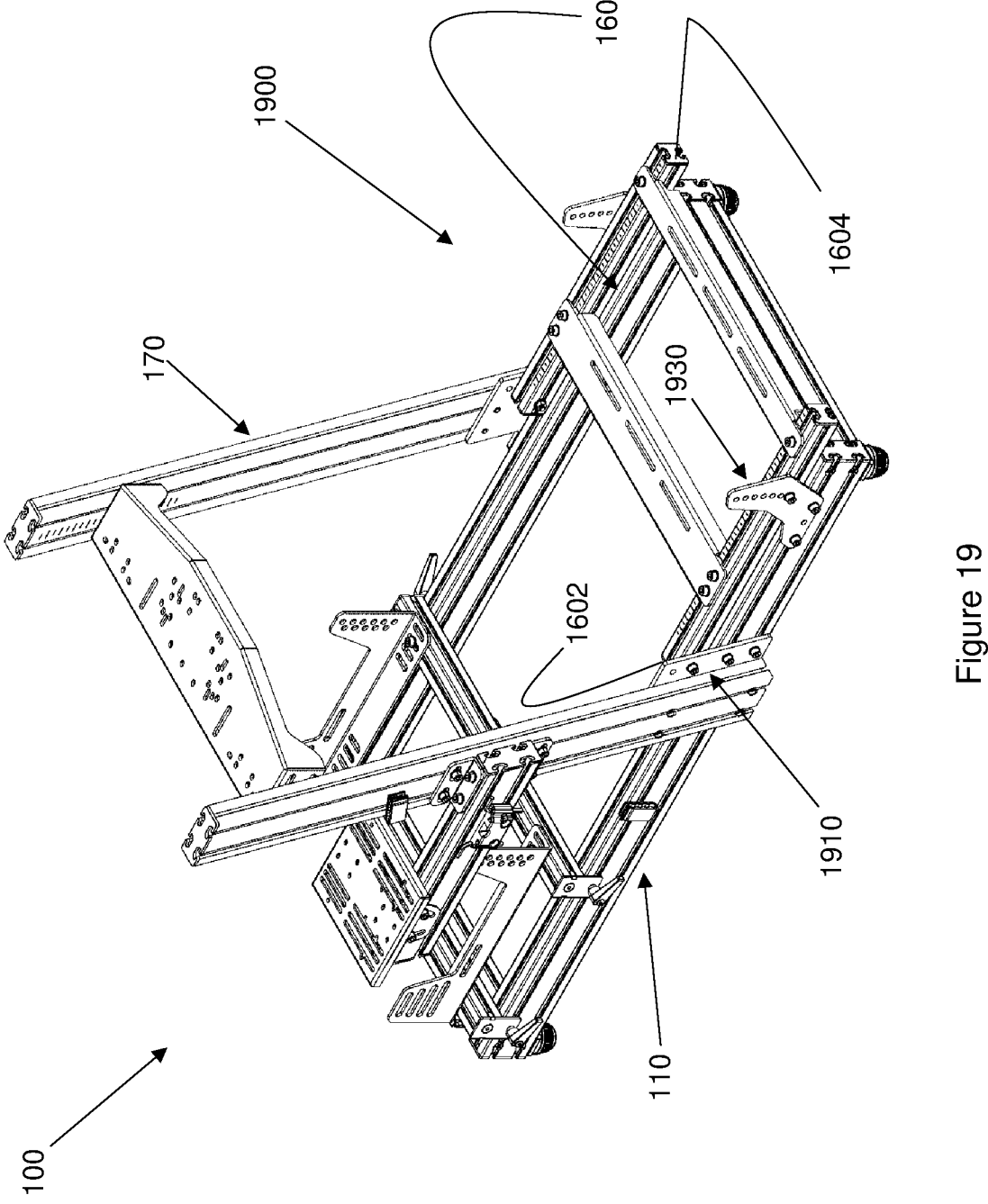
FIG. 19 is an upper perspective view of a support frame assembly for a racing simulator cockpit with a mounting assembly according to an embodiment of the present invention stabilising a pedal set support frame relative to a base frame of the support frame assembly.
Figure 20:
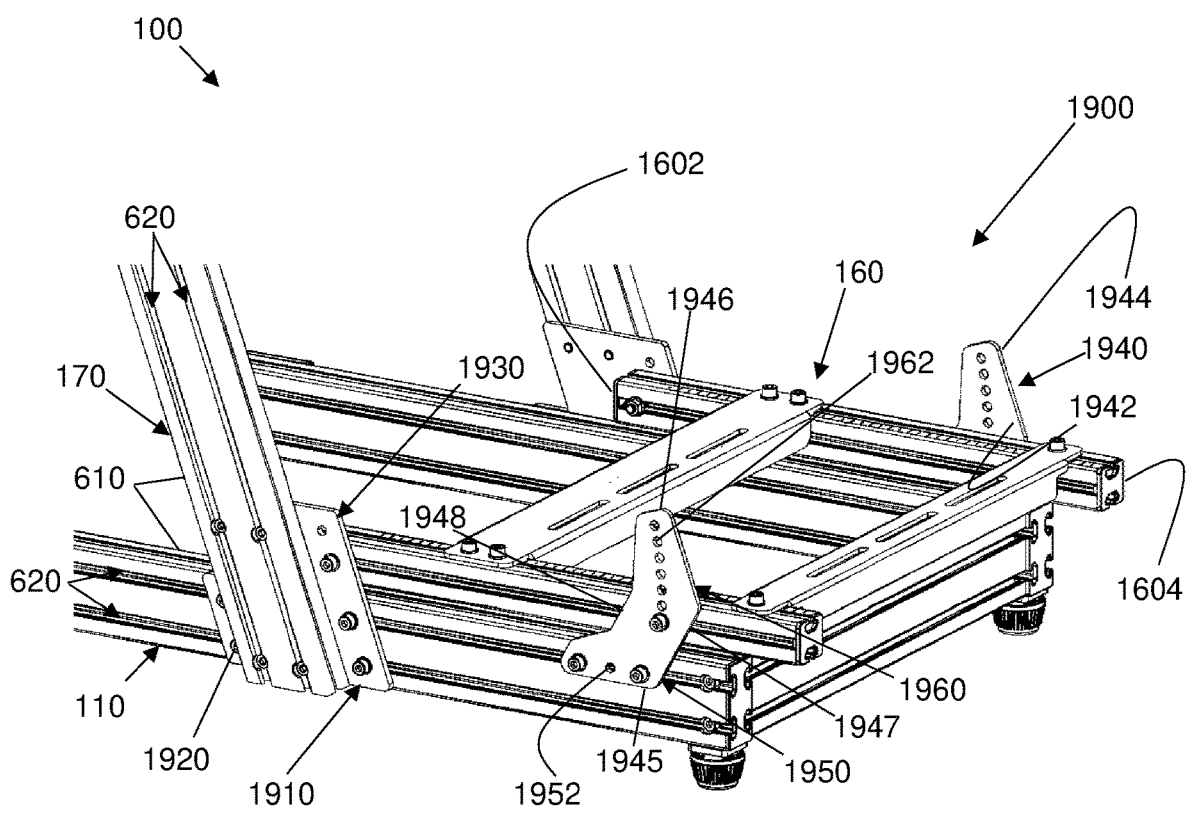
FIG. 20 is an enlarged view of the mounting assembly as shown in FIG. 19.
Figure 21:
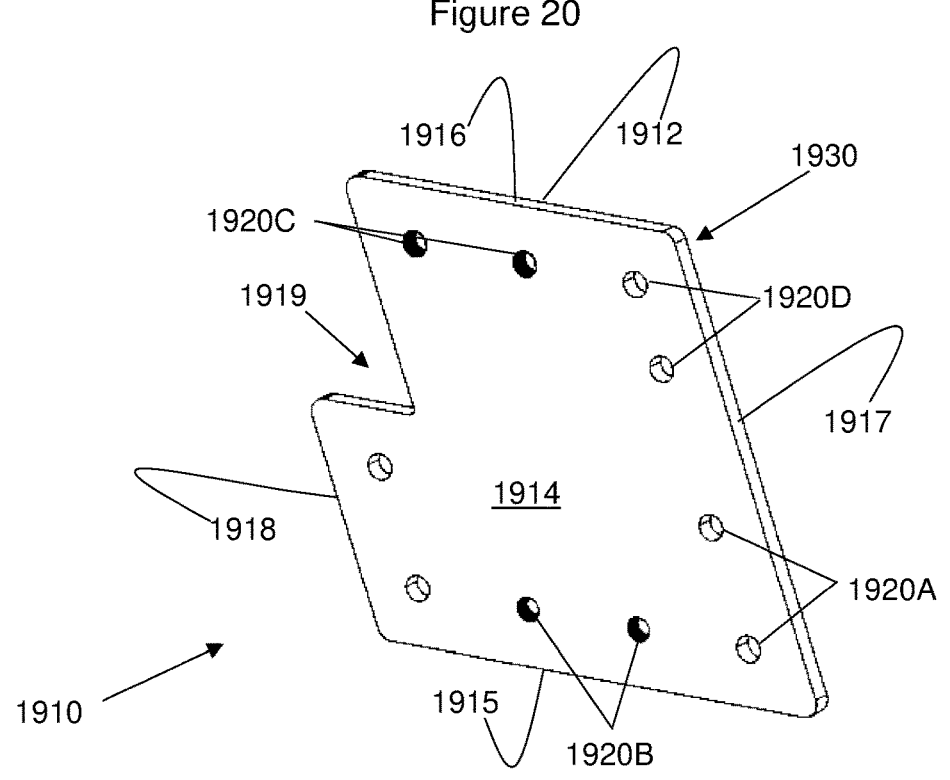
FIG. 21 is a perspective view of a mounting bracket of the mounting assembly as shown in FIGS. 19 and 20.

FIGS. 19 to 21 show another embodiment of a support frame assembly (100), including a mounting assembly (1900) and parts thereof for a racing simulator cockpit. For convenience, features that are similar or correspond to features previously described will be referenced with the same reference numerals.

Referring to FIG. 19, the mounting assembly (1900) includes: a pair of mounting brackets (1910) for interfacing a connecting between a base frame (110) and a steering wheel assembly support frame (170) of the assembly (1900)

and for pivotally mounting the pedal set support frame (160) at or near a first end (1602); and a pair of stabilising mounts (1940) for stabilising the pedal set support frame (160) at or near an opposed second end (1604), which is pivotable between raised and lowered positions, relative to the base frame (110).

As indicated, the mounting assembly (1900) is for stabilising a pedal set support frame (160) relative to a base frame (110) of a racing simulator cockpit, while still allowing the pedal set support frame (160) to be adjustable between various racing configurations, including a formula one racing configuration, a grand touring racing configuration as shown, a hybrid racing configuration, a cup racing configuration, a tank racing configuration, or a truck racing configuration, for example.

Referring to FIG. 20, each mounting bracket (1910) is configured to interface a connection between the base frame (110) and the steering wheel assembly support frame (170) and for pivotally mounting the pedal set support frame (160) thereto.

Referring briefly to FIG. 21, the mounting bracket (1910) has a substantially planar shape having a substantially rectangular profile shape.

The mounting bracket (1910) includes a pair of opposed surfaces, including an inner surface (1912) configured to engage with the base frame (110; not shown) and an opposed outer surface (1914) configured to engage with the steering wheel assembly support frame (170; not shown). The opposed surfaces extend substantially parallel to one another.

The opposed surfaces are interconnected by opposing edges. The opposing edges include a lower edge (1915), an opposed upper edge (1916), a forward edge (1917) and an opposed rear edge (1918).

The lower and upper edges (1915, 1916) extend substantially parallel to one another and are substantially horizontal.

Likewise, the forward and rear edges (1917, 1918) extend substantially parallel to one another and are angled rearwardly so as to match an angle at which the steering wheel assembly support frame (170; not shown) angles rearwardly relative to the base frame (110; not shown).

The mounting bracket (1910) further includes a cut-out portion (1919) defined partially along the rear edge (1918) and the upper edge (1916). The cut-out portion (1919) is configured to complement the angle at which the steering wheel assembly support frame (170; not shown) extends upwards from the base frame (110; not shown) to provide a pleasing aesthetic finish.

As shown, the mounting bracket (1910) includes a plurality of apertures (1920) defined thereon for receiving fasteners therethrough for at least interconnecting the base frame (110; not shown) and the steering wheel assembly support frame (170; not shown).

The apertures (1920) are arranged in a spaced arrangement about a periphery of the mounting bracket (1910) so as to affect a stable interconnection between the base frame (110; not shown) and the steering wheel assembly support frame (170; not shown).

Referring briefly to FIG. 20, the apertures (1920) are generally arranged on the mounting bracket (1910) so as to substantially align with the fastener channels (620) defined on the side frame members (610) of the base frame (110) and the steering wheel assembly support frame (170).

Referring back to FIG. 21, the mounting bracket (1910) includes three pairs of apertures (1920) spaced along the lower edge (1915) and lower portions of the rear and forward edges (1917, 1918) for interconnecting a lower end of the steering wheel assembly support frame (170; not shown) and a side frame member (610; not shown) of the base frame (110; not shown) and for connecting the bracket (1910) to the side frame member (610; not shown).

Opposing pairs of apertures (1920A) defined along the rear and forward edges (1917, 1918) are each configured to receive fasteners therethrough for fastening the mounting bracket (1910) to an outer surface of a side frame member (610) of the base frame (110; not shown).

A central pair of apertures (1920B) defined along the lower edge (1950) are be configured to receive fasteners therethrough for interconnecting the base frame (110; not shown) and the steering wheel assembly support frame (170; not shown).

The mounting bracket (1910) further includes a central pair of apertures (1920C) defined along the upper edge (1916) and configured to receive fasteners therethrough for fastening to the steering wheel assembly support frame (170; not shown).

Referring to FIG. 20, the mounting bracket (1910) further defines a pivot mount portion (1930) for pivotally mounting the first end (1602) of the pedal set support frame (160) thereto.

Referring again to FIG. 21, the pivot mount portion (1930) is a corner portion defined at a junction between the upper and forward edges (1916, 1917).

The pivot mount portion (1930) includes a pair of apertures (1920D) defined thereon in a vertically stacked arrangement for receiving a mechanical fastener therethrough for pivotally mounting the pedal set support frame (160).

Referring back to FIG. 20, the pair of mounting brackets (1910) interface connections between the base frame (110) and the steering wheel assembly support frame (170) and pivotally mount the pedal set support frame (160) on each side of the simulator cockpit.

As indicated, the mounting assembly (1900) further includes a pair of stabilising mounts (1940) for stabilising the pedal set support frame (160) relative to the base frame (110), typically at or near the second end (1604).

Each stabilising mount (1940) has an elongate substantially planar shape, typically having the shape of a back-to-front letter "L".

Each mount (1940) includes a pair of opposed surfaces, including an inner surface (1942) configured to engage with both the base frame (110) and the pedal set support frame (160) and an opposed outer surface (1944). The opposed surfaces extend substantially parallel to one another.

The opposed surfaces are interconnected by opposing edges. The opposing edges include a lower edge (1945), an opposed upper edge (1946) and one or more forward and opposed rear edge portions (1947, 1948) extending therebetween.

The one or more forward edge portions (1947) include a lower forward edge portion and an upper forward edge portion, which together defining a substantially convex forward edge (1947).

The one or more rear edge portions (1948) include three or four rear edge portions (1948) that together define a substantially concave rear edge (1948).

As indicated, the mount (1940) includes a base frame mounting portion (1950) for engaging with and mounting to the base frame (110) via an outer sidewall of a side frame member (610) of the base frame (110). The base frame mounting portion (1950) is located along the lower edge (1945).

The base frame mounting portion (1950) includes a plurality of apertures (1952) defined therein for receiving fasteners therethrough for mounting the stabiliser mount (1940) to the base frame (110).

The apertures (1952) are suitably sized and shaped to receive mechanical fasteners therethrough.

The apertures (1952) are arranged in a spaced arrangement along the lower edge (1945) such that they substantially align with the fastener channel (620) defined on the outer sidewall of the side frame member (610) of the base frame (110).

The stabilising mount (1940) further includes a pedal set support frame mounting portion (1960) extending upwardly from the base frame mounting portion (1950) from a forward edge portion of the base frame mounting portion (1950).

The pedal set support frame mounting portion (1960) also include a plurality of apertures (1962) defined thereon in a linear stacked arrangement and extending at least partially along a height of the portion (1960) for providing discrete mounting points for mounting the pedal set support frame (160) at a selected position between raised and lowered positions.

In use, the pedal set support frame mounting portion (1960) is mounted to the pedal set support frame (160) by a fastener mounted to, and extending outwardly from, the fastener channel (620) extending along an outer sidewall of a side frame member (610) forming the pedal set support frame (160).

Like with the mounting brackets (1910), the mounting assembly (1900) includes a pair of stabilising mounts (1940) for stabilising the pedal set support frame (160) relative to the base frame (110) on each side of the simulator cockpit.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A support frame assembly of a racing simulator cockpit configurable between a formula one racing configuration and a grand touring racing configuration, said assembly comprising:

a base frame defining a forward end and an opposed rear end;

a pair of opposed seat brackets extending from opposed sides of the base frame at or near the rear end for adjustably mounting a seat, said seat brackets adapted to interchangeably mount the seat in the formula one racing configuration and the grand touring racing configuration;

a steering wheel assembly support frame extending upwardly from the base frame at a location between the seat brackets and the forward end of the base frame;

a pedal support frame for having a pedal set mounted thereon, said pedal support frame pivotally coupled at a first end to the steering wheel assembly support frame and having an opposed second end pivotable between the formula one racing configuration and the grand touring racing configuration; and at least one pedal set support bracket extending upwards from one of the opposed sides of the base frame at or near the forward end for supporting the pedal support frame, said pedal set support bracket adapted to be pivotable relative to the base frame for selectively securing the pedal support frame between the formula one racing configuration and the grand touring racing configuration, wherein in said formula one racing configuration the seat is angled rearwards by the seat brackets relative to the base frame at an angle of 120° or greater and the at least one pedal set support bracket extends substantially vertically upwards from the base frame such that the pedal support frame extends at an angle of 45° or greater relative to the base frame, and wherein in said grand touring racing configuration the seat is angled by the seat brackets relative to the base frame at an angle of less than 120° and the at least one pedal set support bracket extends forward from the base frame such that the pedal support frame extends in a horizontal orientation.

2. The assembly of claim 1, wherein the pair of opposed seat brackets, the steering wheel assembly support frame and the at least one pedal set support bracket are each slidably mounted to the base frame so that each is slidably adjustable relative to the forward end and the rear end of the base frame.

3. The assembly of claim 1, wherein the base frame is formed from four frame members joined together, each frame member comprising a pair of opposed ends and an elongate body defined by four sidewalls extending therebetween.

4. The assembly of claim 1, wherein the base frame is formed by a pair of side frame members extending longitudinally and parallel to one another and a pair of cross frame members joining together and extending laterally relative to the side frame members.

5. The assembly of claim 4, wherein each said side frame member has at least one fastener channel extending at least partially along a length of an outer sidewall of the side frame member.

6. The assembly of claim 5, wherein each of the pair of opposed seat brackets defines a plurality of mount points for interchangeably mounting the seat in the formula one racing configuration and the grand touring racing configuration.

7. The assembly of claim 6, further comprising a seat slide assembly comprising:

at least a pair of slide brackets each configured to slidably mount a seat to the base frame via the pair of opposed seat brackets; and at least a pair of slide fasteners each operatively associated with the at least one fastener channel of the side frame members for releasably securing each slide bracket relative to the side of the base frame.

8. The assembly of claim 5, wherein the steering wheel assembly support frame comprises a pair of opposed frame members extending upwardly from opposed sides of the base frame and at least one support bracket extending between upper ends of the frame members for supporting the steering wheel assembly relative to the base frame.

9. The assembly of claim 8, wherein each of the opposed frame members has at least one fastener channel extending at least partially along a length of a sidewall of the frame member.

10. The assembly of claim 9, wherein the at least one support bracket is slidably mounted to the opposed frame members to enable a height of the steering wheel assembly mounted thereon to be adjustable.

11. The assembly of claim 10, wherein the at least one support bracket is slidably mounted to the opposed frame members by a pair of slide fasteners each operatively associated with a respective said at least one fastener channel of the frame members for releasably securing the at least one support bracket relative to the opposed frame members.

12. The assembly of claim 8, wherein the opposed frame members are slidably mounted to the at least one fastener channel such that a position of the steering wheel assembly support frame relative to the forward and rears ends of the base frame is slidably adjustable.

13. The assembly of claim 8, further comprising a subframe for supporting a gear stick shifter assembly and handbrake support assembly.

14. The assembly of claim 13, wherein the subframe comprises a first frame member extending rearwardly from one of the opposed frame members of the steering wheel assembly support frame and a second frame member extending downwardly from a rearmost end of the first frame member and slidably mounting to a side frame member of the base frame, wherein the gear stick shifter assembly and handbrake support assembly are mounted atop the first frame member.

15. The assembly of claim 1, further comprising a tool holder configured to be releasably secured to a frame member of the support frame assembly and hold at least one tool.

16. The assembly of claim 15, wherein the tool holder comprises a body having at least an outer wall, an opposed frame member engaging wall configured to slidably mount to the frame member of the support frame assembly, a lower wall and an opposed upper wall having at least one opening defined therein for receiving and holding the at least one tool.

17. A method of assembling a support frame assembly of a racing simulator cockpit, said method comprising:
 connecting one or more base frame members together to form a base frame of the support frame assembly, said base frame defining a forward end and an opposed rear end;
 slidably mounting a pair of opposed seat brackets to opposed sides of the base frame at or near the rear end for adjustably mounting a seat, said seat brackets adapted to interchangeably mount the seat in a formula one racing configuration and a grand touring racing configuration;
 slidably mounting a steering wheel assembly support frame to a location forward of the rear end and the seat brackets for supporting a steering wheel assembly relative to the base frame;
 pivotally coupling a pedal support frame for having a pedal set mounted thereon at a first end to the steering wheel assembly support frame, said pedal support frame having an opposed second end pivotable between the formula one racing configuration and the grand touring racing configuration; and
 slidably mounting at least one pedal set support bracket to one of the opposed sides of the base frame at or near the forward end for supporting the pedal support frame, said pedal set support bracket adapted to be pivotable relative to the base frame for selectively securing the pedal support frame between the formula one racing configuration and the grand touring racing configuration,
 wherein in said formula one racing configuration the seat is angled rearwards by the seat brackets relative to the base frame at an angle of 120° or greater and the at least one pedal set support bracket extends substantially vertically upwards from the base frame such that the pedal support frame extends at an angle of 45° or greater relative to the base frame, and
 wherein in said grand touring racing configuration the seat is angled by the seat brackets relative to the base frame at an angle of less than 120° and the at least one pedal set support bracket extends forward from the base frame such that the pedal support frame extends in a horizontal orientation.

18. The method of claim 17, wherein each said seat bracket is slidably mounted to at least one fastener channel extending at least partially along a side of the base frame.

19. The method of claim 17, wherein each said seat bracket is mounted to a seat slide assembly mounted to at least one fastener channel extending at least partially along a side of the base frame such that a seat mounted thereon can be slidably adjusted relative to at least a mounted steering wheel assembly and pedal set.

20. A method of adapting a support frame assembly for a racing simulator cockpit between a formula one racing configuration and a grand touring racing configuration, said method comprising:
 adjustably mounting a seat relative to a pair of opposed seat brackets such that the seat has a desired incline relative to the support frame assembly corresponding to one of the formula one racing configuration and the grand touring racing configuration;
 selectively pivoting a pedal support frame to one of the formula one racing configuration and the grand touring racing configuration, said pedal support frame being pivotally coupled at a first end to a steering wheel assembly support frame and having an opposed second end pivotable between the formula one racing configuration and the grand touring racing configuration; and
 securing the pedal support frame in the one of the formula one racing configuration and the grand touring racing configuration with at least one pedal set support bracket extending upwards from a base frame, said at least one pedal set support bracket adapted to be pivotable relative to the base frame for supporting the pedal support frame,
 wherein in said formula one racing configuration the seat is angled rearwards by the seat brackets relative to the base frame at an angle of 120° or greater and the at least one pedal set support bracket extends substantially vertically upwards from the base frame such that the pedal support frame extends at an angle of 45° or greater relative to the base frame, and
 wherein in said grand touring racing configuration the seat is angled by the seat brackets relative to the base frame at an angle of less than 120° and the at least one pedal set support bracket extends forward from the base frame such that the pedal support frame extends in a horizontal orientation.

* * * * *